United States Patent
Kusunoki et al.

(10) Patent No.: US 8,639,089 B2
(45) Date of Patent: Jan. 28, 2014

(54) VIDEO AUDIO RECORDING/PLAYBACK APPARATUS AND METHOD

(75) Inventors: Yoshiaki Kusunoki, Tokyo (JP); Masaaki Shimada, Tokyo (JP); Youhei Kitahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 200 days.

(21) Appl. No.: 12/838,261

(22) Filed: Jul. 16, 2010

(65) Prior Publication Data

US 2011/0013882 A1 Jan. 20, 2011

(30) Foreign Application Priority Data

Jul. 17, 2009 (JP) ................. 2009-168601

(51) Int. Cl.
*H04N 5/92* (2006.01)

(52) U.S. Cl.
USPC .......................................... 386/239; 386/248

(58) Field of Classification Search
None
See application file for complete search history.

(56) References Cited

U.S. PATENT DOCUMENTS

| | | | | |
|---|---|---|---|---|
| 2002/0041754 A1* | 4/2002 | Kikuchi et al. | ................. | 386/46 |
| 2003/0004992 A1* | 1/2003 | Matsui et al. | ................. | 707/512 |
| 2005/0213945 A1* | 9/2005 | Ohiro et al. | ...................... | 386/98 |
| 2006/0107289 A1* | 5/2006 | DeYonker et al. | ............... | 725/37 |
| 2007/0025636 A1* | 2/2007 | Furukawa et al. | ............ | 382/275 |
| 2007/0094290 A1* | 4/2007 | Oka et al. | ....................... | 707/102 |
| 2009/0034937 A1 | 2/2009 | Kusunoki et al. | | |
| 2009/0123086 A1* | 5/2009 | Iwanami et al. | .............. | 382/274 |
| 2009/0196583 A1* | 8/2009 | Murakami | .................... | 386/126 |
| 2009/0324007 A1* | 12/2009 | Oya | .............................. | 382/100 |
| 2011/0239252 A1* | 9/2011 | Kazama et al. | ................. | 725/41 |

FOREIGN PATENT DOCUMENTS

| | | |
|---|---|---|
| CN | 1836284 A | 9/2006 |
| CN | 101238727 A | 8/2008 |
| JP | 2000-224522 A | 8/2000 |
| JP | 2001-177804 A | 6/2001 |
| JP | 3827705 B1 | 9/2006 |
| JP | 2007-049516 | 2/2007 |
| JP | 2007-288608 | 11/2007 |

* cited by examiner

*Primary Examiner* — Huy T Nguyen
*Assistant Examiner* — Eileen Adams
(74) *Attorney, Agent, or Firm* — Birch, Stewart, Kolasch & Birch, LLP

(57) ABSTRACT

During video audio recording, key frames are temporarily stored from the video audio stream to be recorded, and metadata is later generated from the temporarily stored key frames. Even if a CPU or system configuration of a relatively low performance is used, metadata generation can be carried out in parallel with the video recording operation.

22 Claims, 22 Drawing Sheets

FIG.4

| KEY FRAME NUMBER | 0 | 1 | 2 | 3 | 4 | 5 | ... |
|---|---|---|---|---|---|---|---|
| ADDRESS [pack] | 0 | 120 | 204 | 283 | 380 | 483 | ... |
| SIZE [pack] | 120 | 84 | 79 | 97 | 103 | 68 | ... |
| TIME POINT INFORMATION × k [pts] | 0 | 22.5 | 45.0 | 67.5 | 90.0 | 112.5 | ... |

KEY FRAME SEARCH | READING FROM AV STREAM STORAGE | METADATA GENERATION AND WRITING

PROCESS FOR READING KEY FRAME FROM AV BUFFER AND WRITING KEY FRAME IN KEY FRAME TEMP. STORAGE | PROCESS FOR READING KEY FRAME FROM KEY FRAME TEMP. STORAGE | METADATA GENERATION AND WRITING

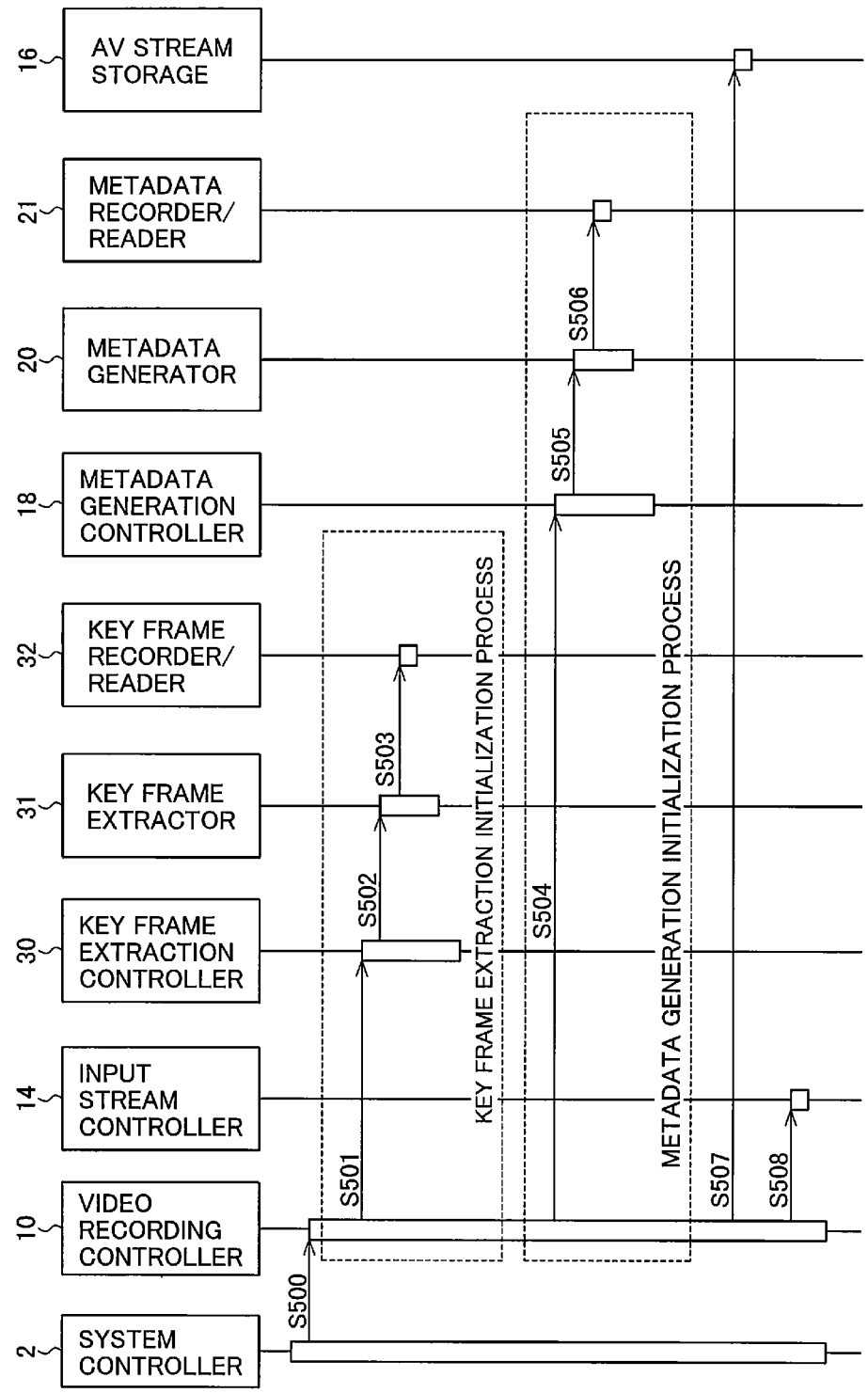

VIDEO AUDIO RECORDING/PLAYBACK APPARATUS AND METHOD

BACKGROUND OF THE INVENTION

1. Field of the Invention

The present invention relates to a video audio reproducing apparatus for recording video and audio signals, and automatically generating metadata for assisting the user in determining the scene to be reproduced at the time of playback or the scene to be edited at the time of editing.

2. Description of the Related Art

With a conventional video recording/playback apparatus, it is not possible to know, in advance, the scenes or the contents in the video which the user is going to view, and it was therefore necessary for the user to find the scene by actually playing back the video or by fast forward, or the like.

To solve the problem, a known video audio playback apparatus uses an EPG (Electronic Program Guide) to display, in advance, the title or the contents of the video program on which the user is to make a decision on whether to view it or not, to enable the user to choose the program to be viewed. Moreover, a technology has been proposed by which the scenes in the programs to be played back are displayed as representative images. For instance, it has been proposed to generate, during video recording, thumbnail images by detecting the encoding parameters in the stream which is to be recorded (see for example, Japanese Patent Application Publication No. 2001-177804 (page 3, FIG. 3)). Furthermore, it has been proposed to automatically detect the scene changes in the digital broadcast program, and identify the index positions (see for example, Japanese Patent Application Publication No. 2000-224522 (pages 3 to 4, FIGS. 1 and 2)). Furthermore, it has been proposed to automatically detect the scene change points by extracting the coded stream, during video recording (see for example, Japanese Patent Application Publication No. 2007-49516 (page 7, FIG. 1)).

With a conventional video recording/playback apparatus, it was not possible to generate metadata showing the features of the AV stream, such as thumbnail images, in parallel with the recording processing, if a CPU of a low processing performance is used.

SUMMARY OF THE INVENTION

An object of the invention is to enable generation of metadata, such as thumbnail images, of video audio contents, during recording, even when a video audio recording/playback apparatus uses a CPU or a system configuration of a relatively low processing performance.

A video audio recording/playback apparatus according to the invention comprises:
  a video audio storage for recording video audio data;
  an input stream controller for temporarily storing the video audio data, and transferring the video audio data stably to the video audio storage;
  a key frame extractor for extracting key frames from the input stream controller;
  a key frame temporary storage for storing the key frames extracted by the key frame extractor while the video audio data are recorded; and
  a metadata generator for generating metadata from the key frames stored in the key frame temporary storage.

The video audio playback apparatus according to the invention is provided with a key frame temporary storage means, as mentioned above, and is configured to record key frames in and read them from the key frame temporary storage means. Accordingly, even if a CPU or a system with a relatively low performance is used, metadata such as thumbnail images of the video audio contents being encoded can be generated during the recording.

BRIEF DESCRIPTION OF THE DRAWINGS

In the attached drawings:

FIG. 4 shows data in the key frame file table indicating the positions of the key frames on the files, according to Embodiment 1 of the present invention;

FIG. 15 is a sequence diagram illustrating the start of the video recording, in Embodiment 1 of the present invention;

DETAILED DESCRIPTION OF THE INVENTION

Embodiment 1

Figure 1:
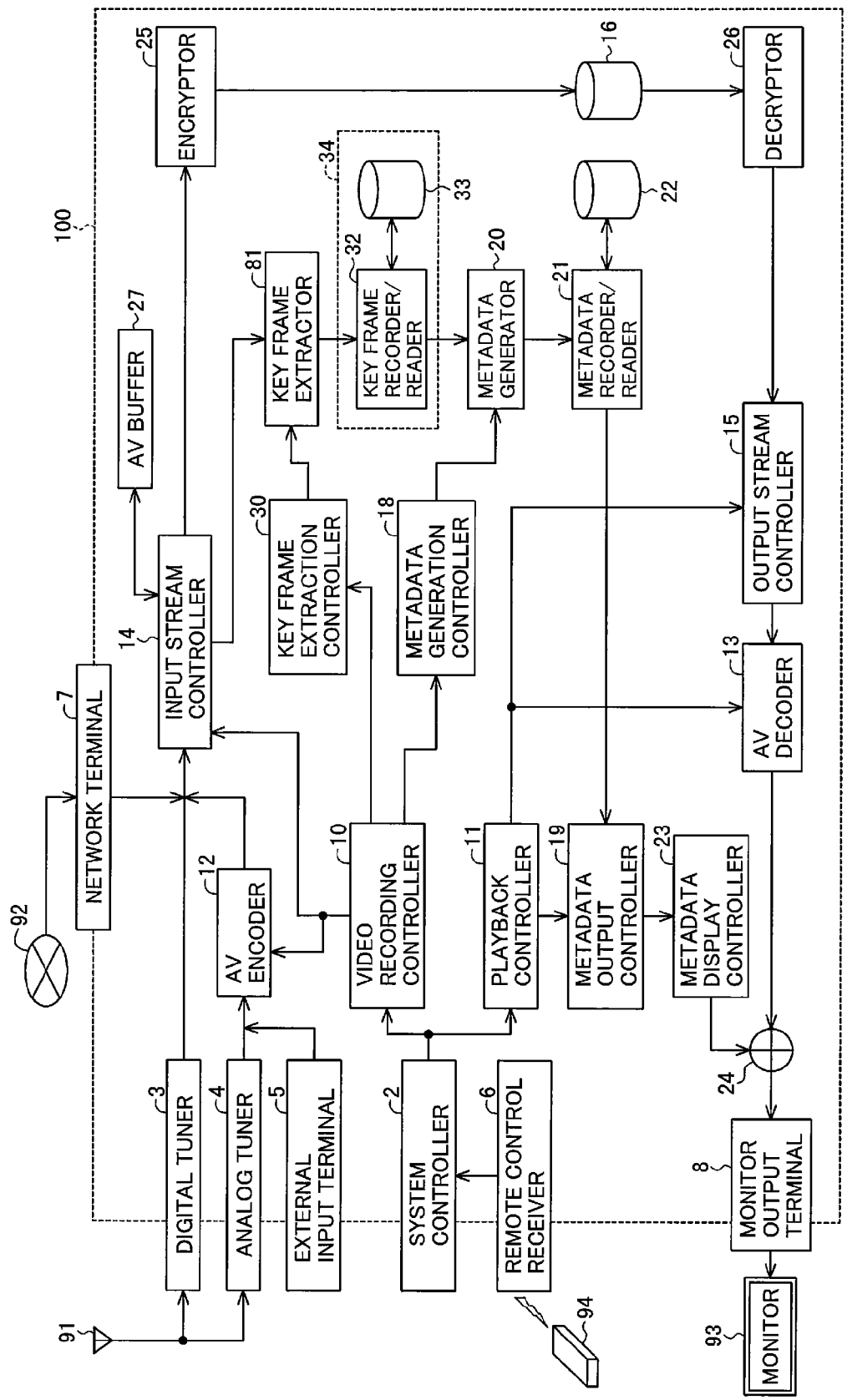
FIG. 1 is a block diagram showing the configuration of a video audio recording/playback apparatus of Embodiment 1 of the present invention.

FIG. 1 is a block diagram showing the configuration of a video audio recording/playback apparatus 100 according to Embodiment 1 of the present invention. The video audio recording/playback apparatus 100 comprises, as interfaces with external devices, a digital tuner 3, an analog tuner 4, an external input terminal 5, a monitor output terminal 8, and a network terminal 7. The digital tuner 3 and the analog tuner 4 are connected to an antenna 91, and are capable of receiving digital broadcasting and analog broadcasting.

The external input terminal 5 mainly corresponds to a composite input, S video input, L-R (left and right) audio inputs, and the like, which are called analog inputs. The monitor output terminal 8 is connected to a monitor 93, so that video and audio signals generated by the video audio recording/playback apparatus 100 can be displayed and output.

The video audio recording/playback apparatus 100 is also provided with a remote control receiver 6 which receives remote control codes transmitted using infrared rays from a remote controller 94 for remote control of the apparatus, and transmits the received remote control codes to a system controller 2.

The system controller 2 controls the video audio recording/playback apparatus 100 responsive to the control signals from the remote controller 94 based on the user's instructions. When the system controller 2 receives the user's instruction for recording, the video recording controller 10 manages starting and ending of the recording, and operations during recording operation.

Functions of video recording digital broadcasting by the video audio recording/playback apparatus 100 will now be described with reference to FIG. 1. The digital broadcasting received by the digital tuner 3 is sent to the input stream controller 14 as full TS (transport stream). The input stream controller 14 temporarily stores data for stably recording the AV stream which is video audio data, in an AV stream storage 16, and performs the process of writing the data steadily in the AV stream storage 16.

The input stream controller 14 also has the function of removing, from the full TS, packets which need not be recorded, to create partial TS. The input stream controller 14 also detects the PID (packet identifier) and section information of the TS, detects the starting position of each GOP (group of pictures), and detects the position and size of the I picture constituting a key frame. The AV stream storage 16 is formed of an HDD (hard disc drive) or the like.

When an AV stream is recorded in the AV stream storage 16, an address map in which the time information and the address information of the AV stream recorded in the AV stream storage 16 is required, in order to improve the scene search performance during playback, and to realize a random seek to an arbitrary time point during special playback. The video recording controller 10 generates an address map based on the GOP start position information detected by the input stream controller 10 during video recording, and stores the address map in the AV stream storage 16. In addition to the address map described above, the AV stream storage 16 also records playback control information including the tile of the recorded program, the record start time, the record ending time, the broadcast service name, the channel number, the video codec information, the audio codec information, and the program detail information.

Functions of video recording of analog broadcasting and video signals input from the outside will now be described. The analog tuner 4 extracts, from the analog broadcasting, the signals of the channel designated by the user. The signals extracted by the analog tuner 4 are converted to video signals, which are then converted to digital signals by an AD/DA converter, not shown, and input to an AV encoder 12. The AV encoder 12 encodes the video signals into an MPEG-2 video, and encodes the audio signals by AAC (advanced audio coding), and the coded video and audio signals are multiplexed into an MPEG-2 transport stream, forming an AV stream. The AV stream is sent to the input stream controller 14, and recorded in the AV stream storage 16. The video and audio signals input from the external input terminal 5 are similarly AD/DA converted, and then converted to an AV stream by the AV encoder 12, and recorded in the AV stream storage 16.

The playback function of the video audio recording/playback apparatus 100 will now be described with reference to FIG. 1. When the user presses a "recorded title list" button provided on the remote controller 94, all or part of the titles of the recorded programs are displayed on the display screen. The user then moves the cursor to the title of the desired program, by the use of left/right/up/down cursor keys provided on the remote controller 94, and then presses a "decision" key, to select the tile to be played back. Infrared ray signals representing the selected title are transmitted from the remote controller 94 to the remote control receiver 6, where they are converted to software codes, and sent to the system controller 2, and the screen is thereby updated. When the apparatus is not in a playback standby state, nor in a video recording standby state, the transmitted codes are sent to a playback controller 11, and a corresponding playback operation function is called, and the playback state is changed.

Playback operation will now be described in further details.

When the user makes a decision on the title to be played back, the playback controller 11 reads playback control information concerning the designated title, and input it into a RAM, not shown. The playback controller 11 uses the address map included in the playback control information, and reads the address information corresponding to the playback start point of the stream to be played back, and reads the AV stream at the address from the AV stream storage 16, and sends the stream to the output stream controller 15. The AV decoder 13 decodes the AV stream transmitted from the output stream controller 15, in the order of transmission, and outputs the decoded data to through the monitor output terminal 8 to the monitor 93.

The output stream controller 15 reads the AV stream recorded in the AV stream storage 16, such that the decoding of the video audio data can be continued, so as to prevent the AV decoder 13 from experiencing underflow or overflow causing interruption of video or audio. The output stream controller 15 performs the transfer to the AV decoder, using DMA (direct memory access) transfer function, which is an H/W assist (hardware assistance).

A key frame extraction operation at the video audio recording/playback apparatus 100 will next be described.

Key frames are extracted at the input stream controller 14, from the AV stream transferred to the AV stream storage 16. The following description is made taking an example in which key frames are extracted from the AV stream every five seconds. When the video recording controller 10 detects expiration of a period of five seconds, it outputs an instruction for key frame extraction to the key frame extraction controller 30.

The key frame extraction controller 30 instructs the key frame extractor 31 to extracts key frames at designated time points.

The key frame extractor 31 finds out key frames at the designated time points from the AV stream present in the input stream controller 14, and sends the bit stream of the key frames to the key frame recorder/reader 31. If the AV stream is an MPEG-2 stream, I pictures according to the MPEG-2 are obtained. The key frame recorder/reader 31 stores the extracted key frames in the key frame storage 33 within the key frame record manager 34.

Metadata extraction will now be described. It is assumed that generation of metadata is performed during recording or during the process for ending the recording. For instance, metadata is formed, when CM (commercial message) section is detected by means of a CM detection mechanism, not shown, during recording, or when a scene change in a video is detected, or when a characteristic audio is detected in the audio signals. The following description is made taking an example, in which the ending time point of a CM is detected by a CM detection mechanism, and a thumbnail image at that time point is generated.

Based on a CM detection signal input to the video recording controller 10 from the CM detection mechanism, the video recording controller 10 outputs an instruction for metadata generation, to the metadata generation controller 18. The metadata generation controller 18 instructs the metadata generator 20 to generate a thumbnail which is metadata of the corresponding time point. The metadata generator 20 requests the key frame recorder/reader 32 to read the corresponding key frame data. The key frame recorder/reader 32 extracts, from the key frame data stored in the key frame temporary storage 33, corresponding key frame data, and sends the read key frame data to the metadata generator 20.

If no corresponding key frame is found, data of the preceding or succeeding key frame is extracted, and sent to the metadata generator 20. The metadata generator 20 generates a thumbnail image from the read key frame. If the key frame is an I picture of MPEG-2, the metadata generator 20 performs the functions of decoding MPEG-2 data, and performs the processing of generating bit map in a format in which the thumbnail image can be displayed. The metadata which is a generated thumbnail image in the bit map format is stored by the metadata recorder/reader 21 in the metadata storage 22.

Figure 2:
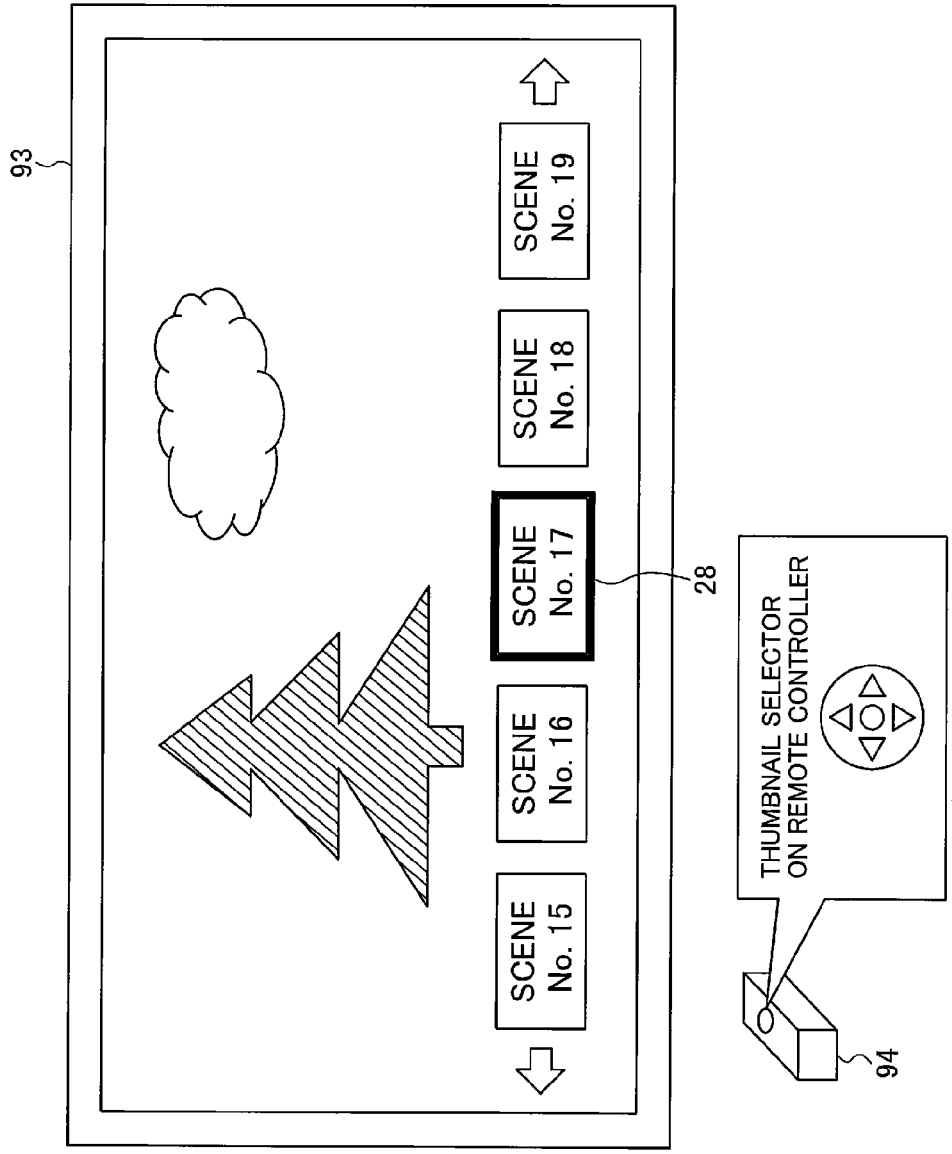
FIG. 2 shows an example of display screen used for thumbnail selection operation in Embodiment 1 of the present invention.

Next, description is made of a method for reproducing an arbitrary scene using the thumbnail information which is a metadata, in the video audio recording/playback apparatus 100. FIG. 2 shows a state in which AV stream playback video and thumbnail images are superimposed on a monitor 93. The thumbnail images are displayed on the monitor 93, by reading, by means of the metadata recorder/reader 21, the thumbnail information stored in the metadata storage 22, converted to images by a metadata display controller 23, and superimposed on the playback video at the graphics superimposing section 24.

If the user selects a desired title, the playback controller 11 starts playback of the selected title. The playback controller 11 reads the AV stream from the AV stream storage 16 and outputs it to the output stream controller 15. The AV stream read to the output stream controller 15 is decoded by the AV decoder 13, and displayed on the monitor 93.

When the user presses a dedicated button, provided on the remote controller 94, for activating the user interface shown in FIG. 2, the playback controller 11 informs the metadata output controller 19 of the title to be reproduced, and the elapsed time information of the playback video. The metadata output controller 19 reads five thumbnails, including that of the elapsed time (current thumbnail), and two in the immediate past and two in the immediate future, from the metadata storage 22, via the metadata recorder/reader 21. The metadata output controller 19 generates thumbnail images from the thumbnail data, and generates a selection frame 28, and outputs them to the metadata display controller 23. The metadata display controller 23 develops the metadata of the thumbnail into images, and outputs them, together with selection frame, to the graphics superimposing section 24.

By the above processing, five thumbnails, including the thumbnail (Scene No. 17) corresponding to the current scene, and two in the immediate past and two in the immediate future, are displayed as shown in FIG. 2. In the initial state in which the thumbnails are displayed, the remote control selection frame is displayed, being fitted on the thumbnail image for the scene currently being reproduced. Here, the scene No. 17 is being reproduced, so that the remote control selection frame 28 is displayed at the thumbnail of the scene No. 17. The user can move the selection frame to the left or to the right, using the left-right key, and select the desired scene. The selection frame generation is so made that the thumbnail selection frame 28 moves to the left or right, in response to the remote control operation.

If, the left cursor key is pressed in a state in which the remote control selection frame 28 is at the left end of the screen, or the right cursor key is pressed in a state in which the remote control selection frame 28 is at the right end of the screen, the entire thumbnails are moved in the direction opposite to the direction of the cursor key being pressed, so that the thumbnail of the scene which has not been displayed begins to be displayed. If the user presses the "decision key" after bringing the cursor to the desired thumbnail, the playback controller 11 is made to terminate the playback of the contents which has been played back.

Moreover, the playback controller 11 issues an instruction for resuming the playback at the time designated by the scene entry information indicating the scene start position selected by the user. The playback controller 11 uses the address map information stored in the AV stream storage 16, to convert the entry time information into address information of the AV stream, and sends the address information to the output stream controller 15.

Based on the address information from the playback controller 11, the output stream controller 15 reads the AV stream data of the selected scene from the AV stream storage 16, and outputs it to the AV decoder 13. The AV decoder 13 decodes the AV stream data from the output stream controller 15. As a result, playback of the scene corresponding to the thumbnail selected by the user is enabled.

Figure 3:
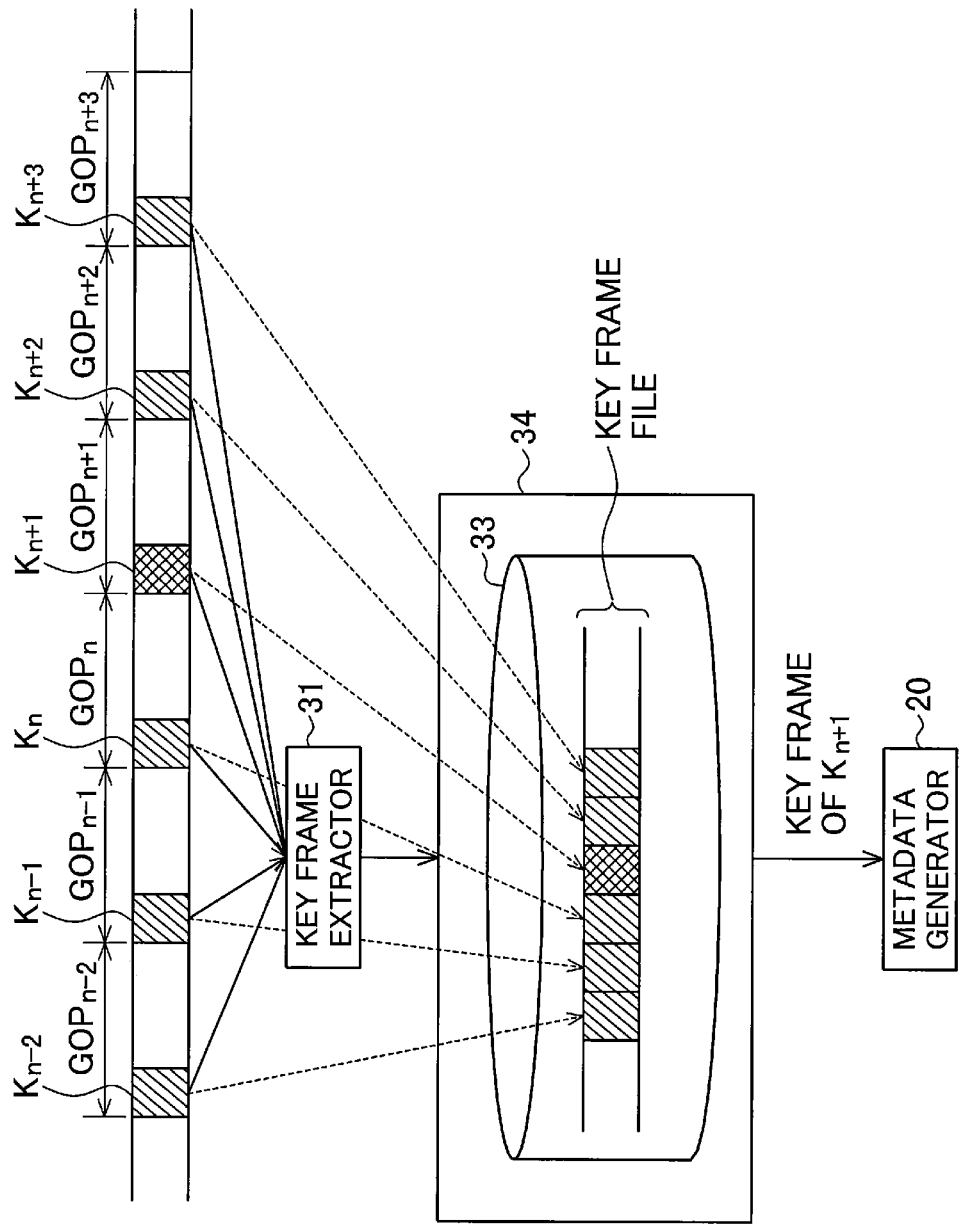
FIG. 3 shows a relationship between an AV stream, extraction, and temporarily stored key frames, in Embodiment 1 of the present invention.

FIG. 3 shows a relationship between key frames, and the bit stream from which the key frames have been extracted, using an MPEG-2 bit stream, as an example of AV stream. Each GOP (group of pictures) in the MPEG-2 bit stream includes an I picture as a key frame. Here, I pictures are denoted by "K" and indicated by hatching. In many cases, I pictures are positioned at the head of the GOPs.

The key frame extractor 31 obtains, from the input stream controller 14, the size information of each GOP and I picture, and extracts the I picture data. The extracted I pictures constituting key frames are passed through the key frame recorder/reader 32 in the key frame record manager 34, and stored in the key frame temporary storage 33. Here, the key frames are stored, being joined together in the order in the original bit stream, and made into a single file. This file will be hereinafter referred to as "key frame file."

Because the video audio data of the key frames are made in a single file, access to the key frames is achieved by access to a single file, so that the number of file handles utilized at the time of the file access can be "1". Moreover, because there is just one file, it is possible to avoid file access collision, during the exclusive control over the file access for the purpose of reduction in the memory size or the system load, or updating or rewriting of the data written in the key frame file. Moreover, deletion of a single key frame is easier, than deletion of multiple key frame files, if such deletion is to be made after the recording is ended, so that process time is shortened.

FIG. 4 shows the contents of a key frame file table used when each key frame data is accessed, when the key frames are stored in a single file. In the key frame file, the respective key frame data are recorded in their order in the original bit stream. The latest key frame data is recorded at the end of the key frame file, and, at the same time, the information on the latest key frame shown in FIG. 4 is added to the end of the key frame file table information. It is assumed that, for each key frame, the address information on the key frame file, the size information, and the time point information in the AV stream are recorded as the key frame file table information.

"Pack" rather than "byte" is used as a unit of address and size information. Generally, "pack" is used as a unit for data transfer in the case of MPEG-2 bit stream. This is because it is more convenient in managing the data size, and it is easier to process in the design of the data storage area size. Here, "pack" which is a standard unit in MPEG-2 is used. Incidentally, a pack used in MPEG-2 bit stream is 188 bytes or 192 bytes in the case of a transport stream, and 2048 bytes in the case of a program stream.

Next, description is made of reading key frame data when metadata is generated. The metadata generator 20 obtains the data position and size of the key frame from which it is desired to generate the metadata, referring to the key frame file table shown in FIG. 4, and extracts the key frame data, from the key frame file stored in the key frame temporary storage 33. By the provision of the key frame file table, the key frame extractor 31 can obtain any previous key frame, without regard to the order of arrangement in the key frame file. As a result, it is possible to generate metadata, without regard to the time position of the program. It is therefore possible to cope with any requests for metadata generation in a random order, from a plurality of detection mechanisms, such as a scene change detection mechanism, and a CM detection mechanism, provided separately.

Figure 5:
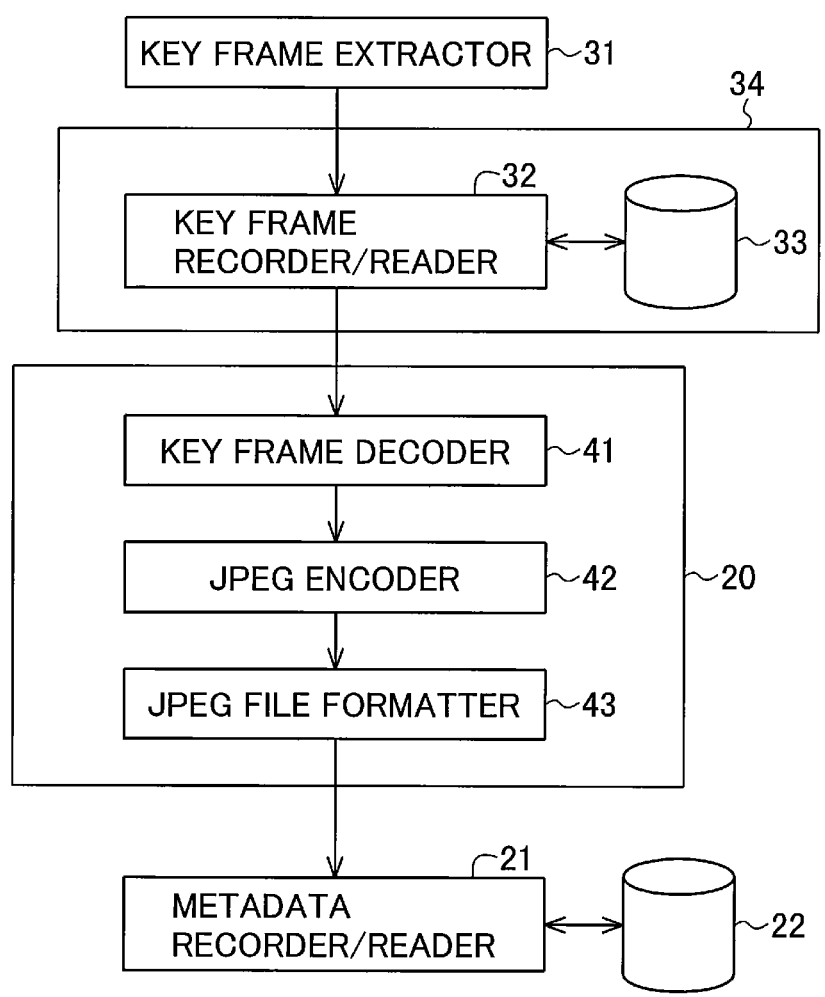
FIG. 5 is a block diagram showing the configuration for generation JPEG thumbnails as metadata, in Embodiment 1 of the present invention.

Next, description is made of metadata generation referring to FIG. 5. The key frames extracted by the key frame extractor 31 are passed via the key frame recorder/reader 32 forming the key frame record managing section 34, and recorded, in key frame file format, in the key frame temporary storage 33.

Here, description is made of a case where JPEG thumbnails are generated, as an example of metadata generation. JPEG thumbnails are generated from key frames which are MPEG-2 I pictures by the metadata generator 20, in the following manner. The key frame decoder 41 decodes the MPEG-2 I pictures to restore non-compressed image data of Y, Cb and Cr. The JPEG encoder 42 compressively encodes the image data in the Y, Cb, Cr format, to produce JPEG data, and the JPEG file formatter 43 adds a file header for JPEG file, to produce a file. The generated JPEG files are sent to the metadata recorder/reader 21, and recorded in the metadata storage 22.

Figure 6:
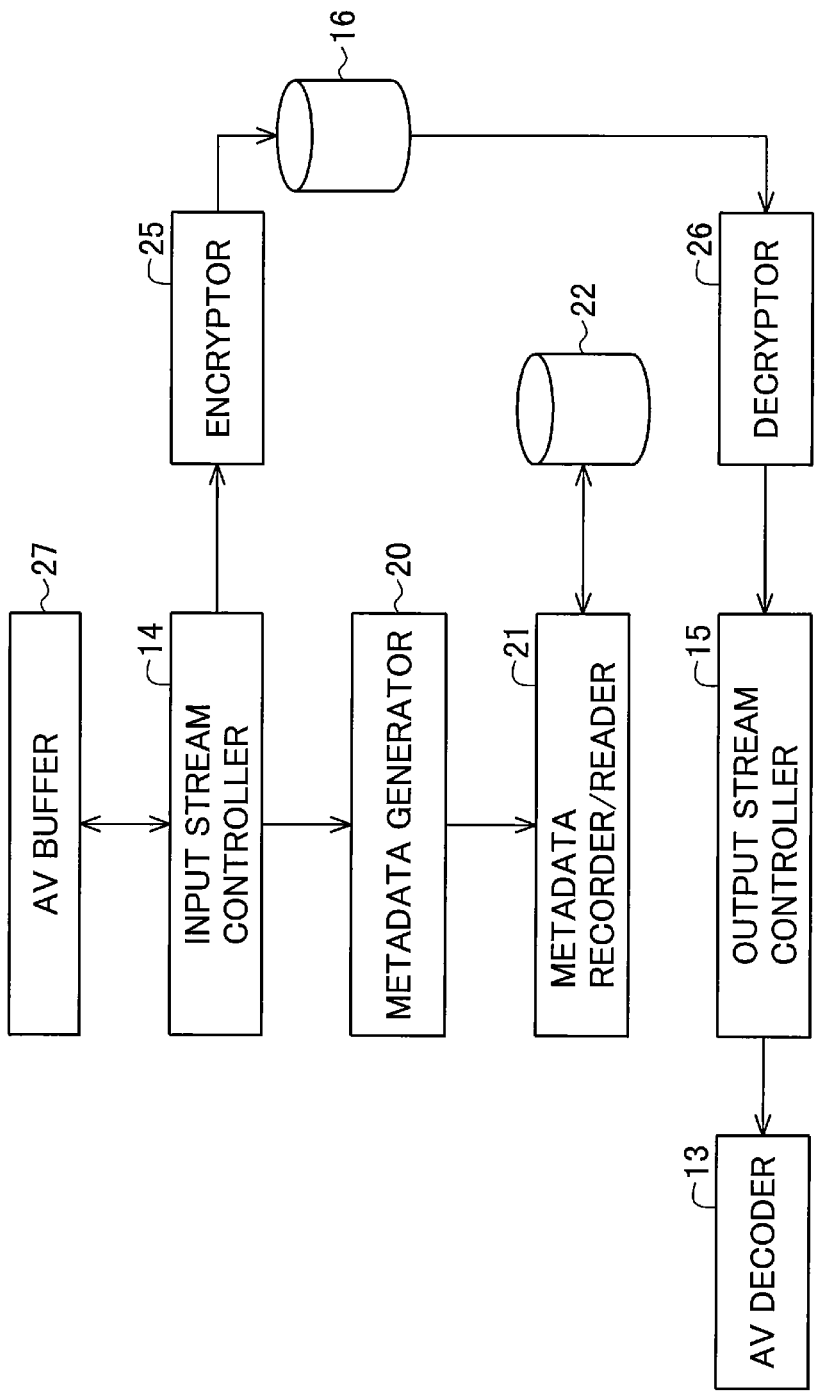
FIG. 6 is a block diagram showing the configuration for extracting metadata from the key frame read from the input stream controller, in Embodiment 1 of the present invention.

Next, FIG. 6 is referred to in describing the flow of data from the AV stream to the metadata generation when the key frame temporary storage 33 is not provided. It is assumed that when the AV stream is recorded in the AV stream storage 16, encyption is made by the encryptor 25. When key frames are extracted at the input stream controller 14 as shown in FIG. 6, and metadata is generated directly at the metadata generator 20, the key frames extracted at the input stream controller 14 are immediately converted to and recorded in the metadata storage 22. An advantage is that the data can be passed from the input stream controller 14 to the metadata storage 22 over a short path.

However, the data from which metadata can be generated is available only for several mega bytes, or several seconds, from an AV buffer 27 connected to the input stream controller 14, and the data present for a certain time on the AV buffer 27, may be replaced with another data after several seconds, and it is not possible to generate the metadata taking a sufficient time.

Figure 7:
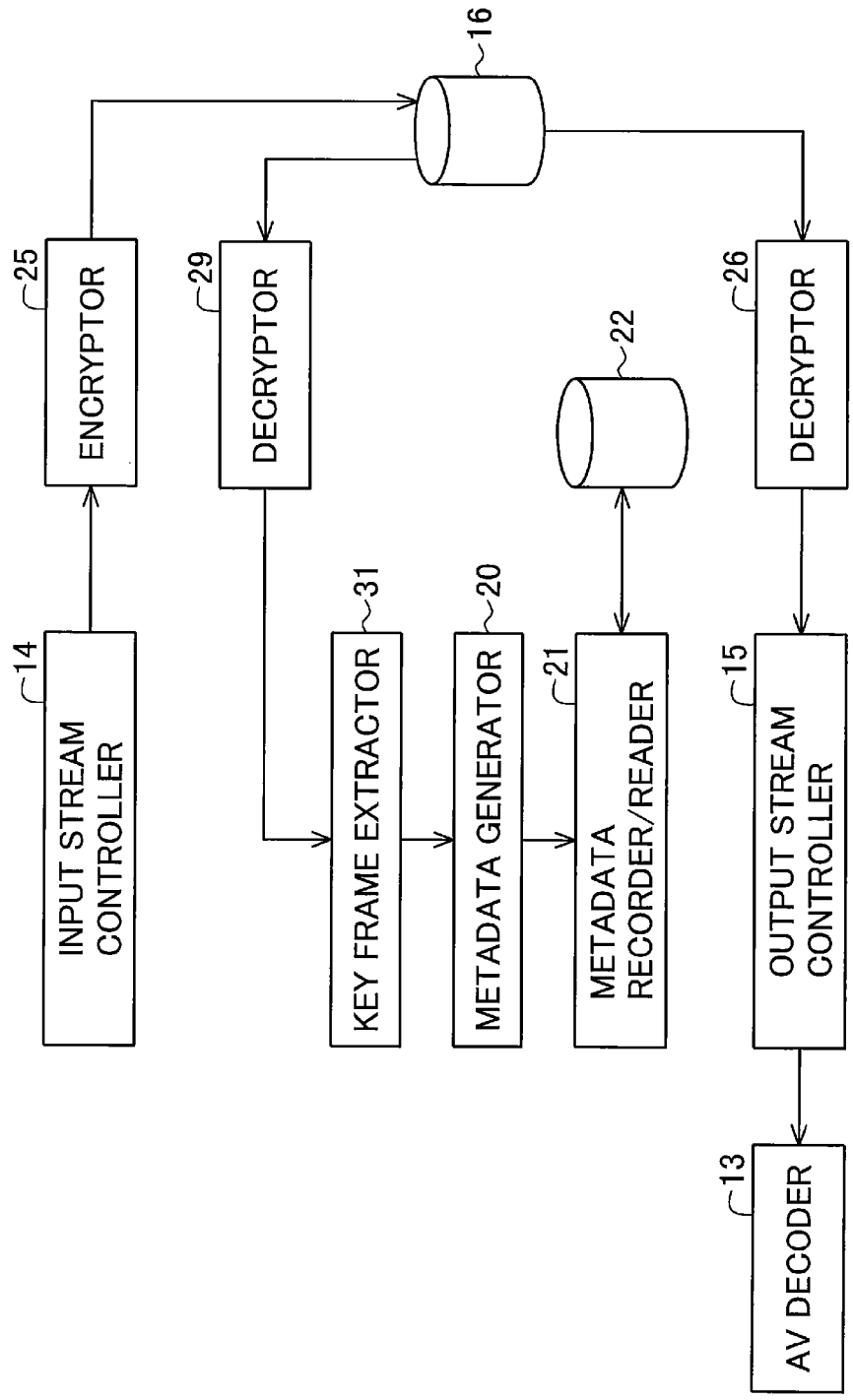
FIG. 7 is a block diagram showing the configuration for reading key frames from the AV stream, and extracting metadata, in Embodiment 1 of the present invention.

Next, FIG. 7 is referred to in describing the case where key frames are obtained from the AV stream storage 16. In this case, the key frames are extracted from the AV stream storage 16, so that there is no time restriction on the key frame extraction and metadata generation, so that metadata can be generated taking sufficient time. However, encryption is generally made using an encryptor 25 when the AV stream produced by compressively-coding the video data obtained from the broadcast wave, or the AV stream directly obtained from the broadcast wave is recorded in the AV stream storage 16, such as HDD. This is for preventing the user from exchanging, without authorization, the HDD in which the AV stream is stored, or from extracting the AV stream from the HDD, for unauthorized copying.

A decryptor 26 is required to decrypt the encrypted AV stream to produce AV stream which can be played back. The decryptor 26 is provided in front of the output stream controller 15 which supplies the AV stream to the AV decoder 13, and the AV decoder 13 receives a so-called plain text AV stream having been decrypted.

When the meta data is generated from the AV stream storage 16, it is also necessary to decrypt the encrypted AV stream. The decryptor 26 is provided only for playback, and cannot be shared between different purposes, so that a second decryptor 29 is required for decryption for metadata generation. For generating metadata, the key frame extractor 31 extracts the I picture at the designated time point or position within the encrypted AV stream from the AV stream storage 16, and the second decryptor 29 decrypts the extracted I picture, and sends the decrypted data to the metadata generator 20. The metadata generator 20 generates the metadata from the key frame, and the metadata is passed through the metadata recorder/reader 21, and written in the metadata storage 22.

In this case, the AV stream storage 16 is simultaneously accessed by various functions for the recording, the playback, and the metadata generation, so that adverse effects, such as operation delay, or disorder in the recorded video or playback video may occur. Furthermore, it may not be possible to provide the second decryptor 29 because of H/W restriction, or the higher cost may be problematical.

Figure 8:
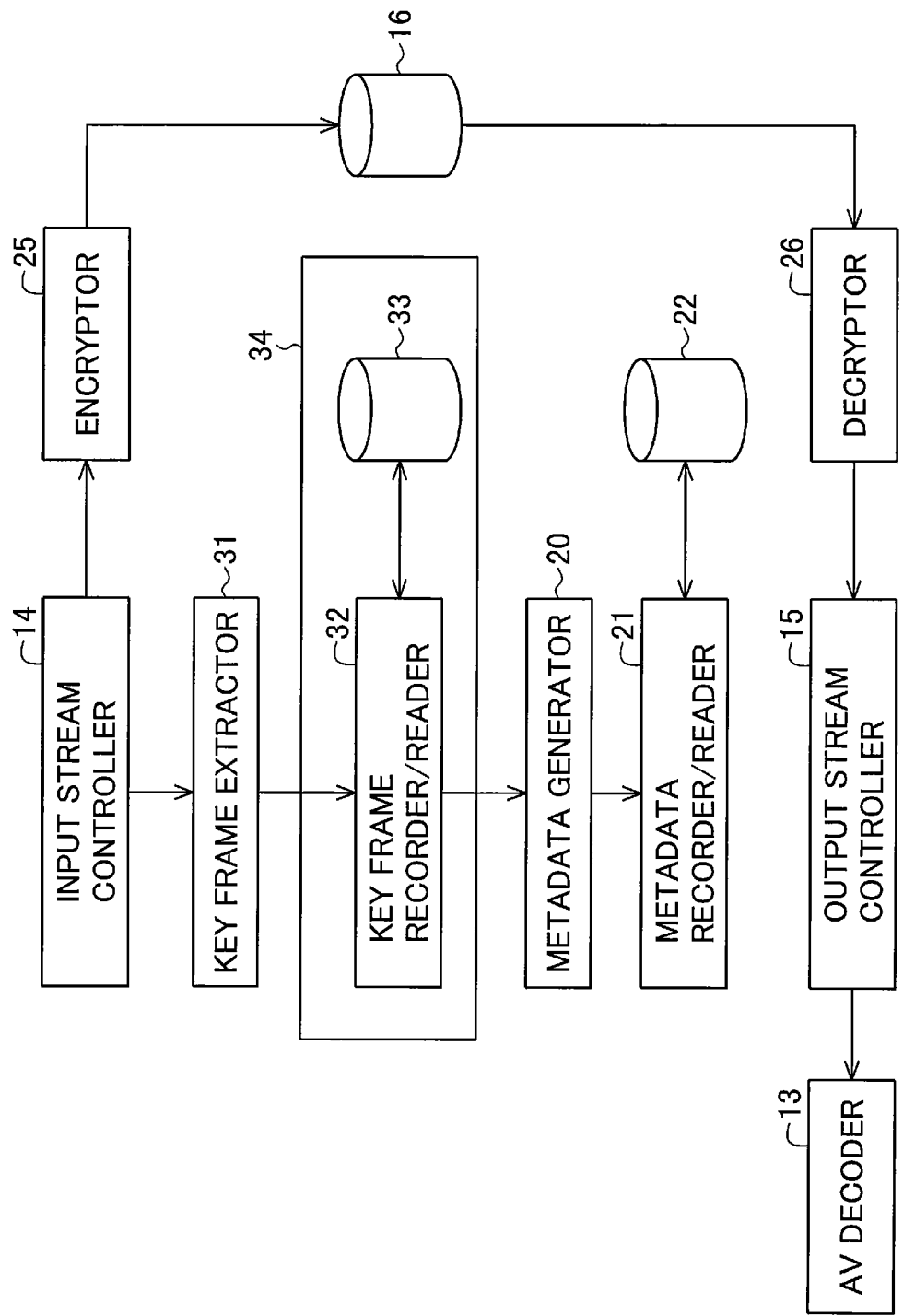
FIG. 8 is a block diagram showing the configuration for extracting metadata from the key frames temporarily stored in the key frame temporary storage, in Embodiment 1 of the present invention.

As a solution, a configuration shown in FIG. 8 may be used in which only key frames are extracted from the input stream controller 14, and stored in the key frame temporary storage 33, and when the metadata generator 20 generates the metadata, desired key frame is read from the key frame temporary storage 33. In this case, the key frames obtained from the input stream controller 14 are not decrypted, so that it is unnecessary to provide a separate decryptor. Moreover, because the key frames at least up to the current recording elapsed time, of the program being recorded, in the key frame temporary storage 33, the metadata corresponding to the desired time can be generated at an arbitrary timing.

Figure 9:
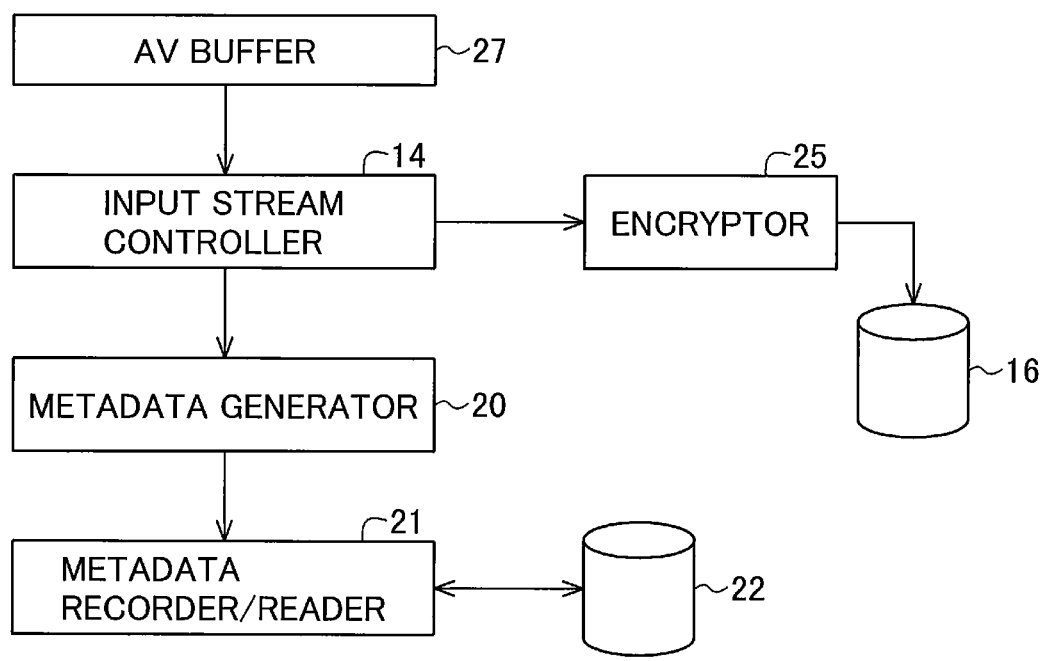
FIG. 9 shows a relationship between the AV buffer and the input stream controller in Embodiment 1 of the present invention.

Next, a problem that occurs when the metadata is generated in parallel the recording operation, referring to FIG. 9. FIG. 9 shows the case where the key frame temporary storage 33 is not present. In this case, key frames are extracted directly from the AV buffer 27 connected to the input stream controller 14, and the metadata is generated at the metadata generator 20, and recorded by the metadata recorder/reader 21. Here, a bit stream is written in the AV buffer 27, and transferred to the AV stream storage 16, which may be an HDD.

Figure 10:
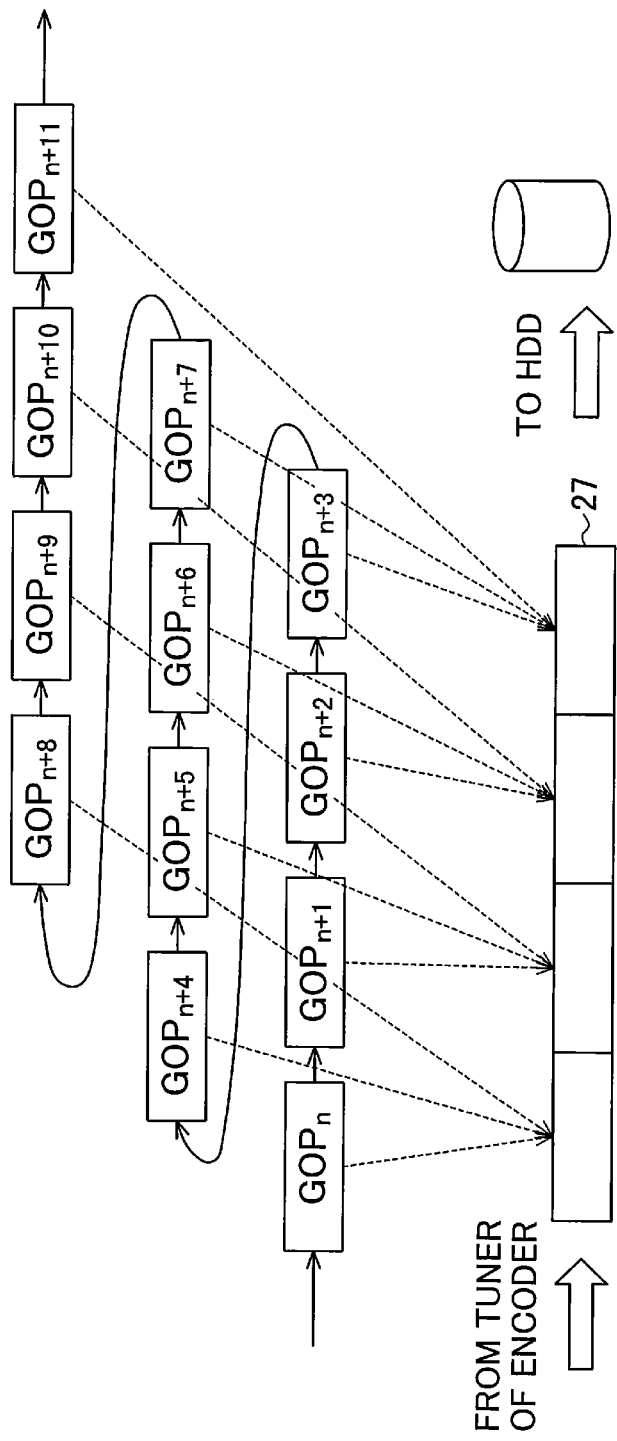
FIG. 10 is a diagrams for explaining the GOP data input to the AV buffer, and overwriting of the data, in Embodiment 1 of the present invention.

The manner in which the bit stream is sequentially written in the AV buffer 27 is schematically shown in FIG. 10. It is assumed here that the AV stream is an MPEG-2 stream, and processed taking each GOP as a unit. The GOPs output from the digital tuner 3 or AV encoder 12 are recorded in the AV buffer 27, in the order of time, as represented by $GOP_n$, $GOP_{n+1}$, $GOP_{n+2}$, . . . . As the recording continues, and there remains no vacant capacity in the AV buffer 27, when $GO_{Pn+4}$ is recorded, $GOP_{n+4}$ is written over $GOP_n$, and new data is written over the old data, in the order of time.

Naturally, transfer of each GOP to the HDD or the like must be conducted before the GOP is overwritten with another GOP data. If the AV stream is analyzed on the AV buffer 27, the data being analyzed may be overwritten, and the time restriction is therefore very severe.

Figure 11:
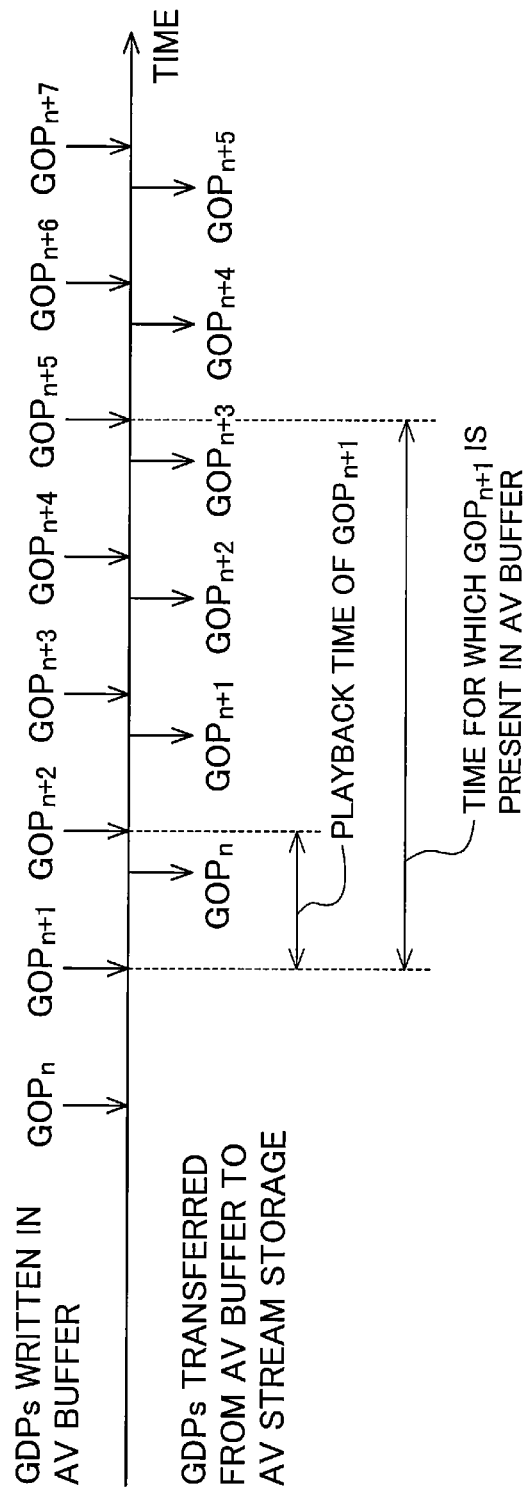
FIG. 11 is a diagram showing the GOPs input to and output from the AV buffer, and the restriction regarding process time, in Embodiment 1 of the present invention.

Next, restriction imposed in generating metadata is explained referring to FIG. 11. If attention is drawn to the fact that the writing of GOPs in the AV buffer 27 and the transfer to the HDD 16 must be conducted continuously, the sum of the time taken for recording each GOP and the time taken to generate the metadata allocated to the GOP, must be not more than the time for playing back the GOP, in order to process the metadata in real time.

In the case of JPEG thumbnail generation, for example, it takes several seconds to generate the metadata, including the MPEG-2 decoding and JPEG encoding. In the case of an MPEG-2 stream transmitted by broadcast wave, playback time of a GOP is generally about 0.5 seconds. It is therefore necessary to complete the process of one GOP, including the metadata generation, within 0.5 seconds.

With regard to the metadata generation, the processing can be divided among processing times for the respective GOPs, but whether the original data is available when the metadata is generated is crucial. That is if the AV buffer 27 is a ring buffer, as explained with reference to FIG. 10, and each GOP data may be overwritten with a future GOP data, and thereby erased. For instance, $GOP_{n+1}$ is valid and available on the AV buffer 27 until the next $GOP_{n+5}$ is written. That is in order that the AV buffer 27 can be referred directly, generation of the metadata corresponding to the $GOP_{n+1}$ must be completed, before the $GOP_{n+1}$ is overwritten with another GOP data, i.e., before $GOP_{n+5}$ is written.

However, there are cases where it is difficult to generate a JPEG thumbnail from the MPEG-2 video, within the time permitted for the process of the GOP, or within the time for which the GOP in question stays in the AV buffer 27.

Figure 12:
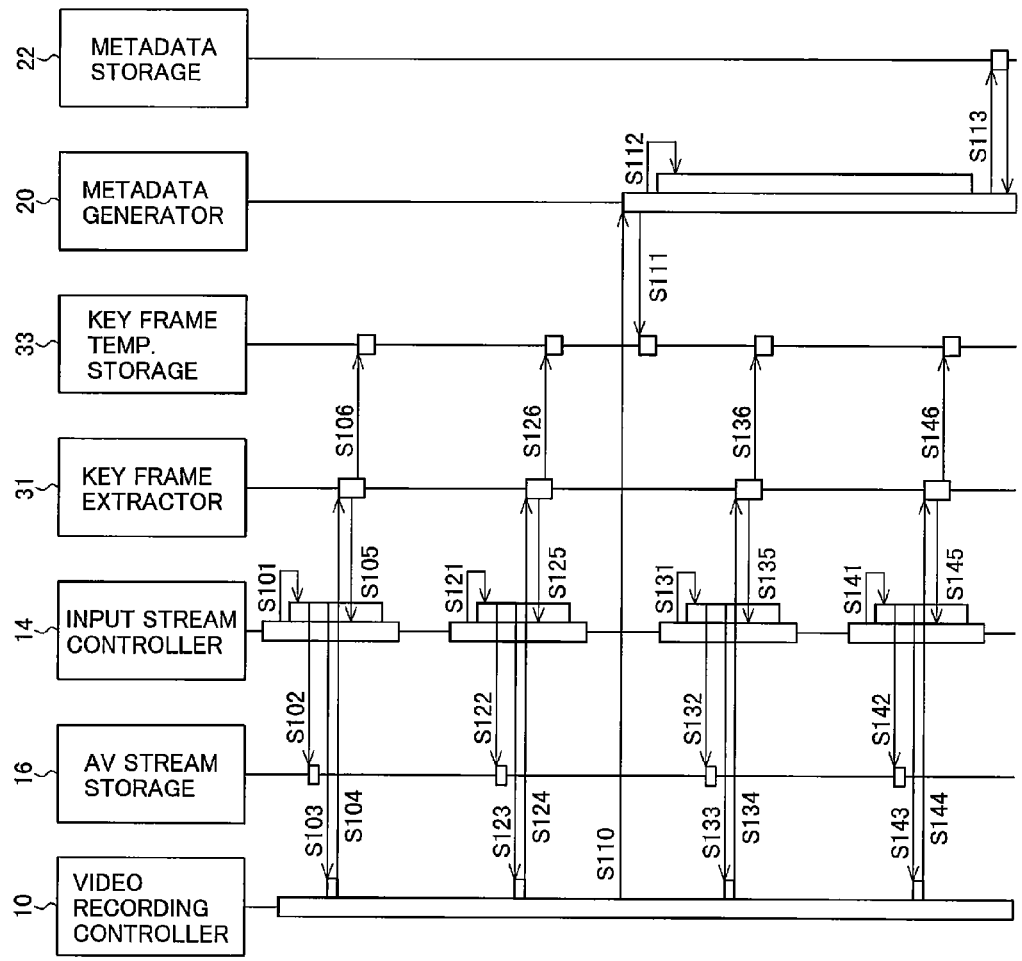
FIG. 12 is a sequence diagram illustrating the key frame extraction process and metadata generation in Embodiment 1 of the present invention.

It will next be described that the above problems can be solved by temporarily storing key frames as shown in FIG. 1 and FIG. 8, referring to the sequence diagram of FIG. 12. Here, it is assumed that the AV stream is transferred taking each GOP as a unit, and key frames of all the GOPs are stored in the key frame temporary storage 33. Also, what follows is a description of the video recording process taking each GOP as a unit, at an arbitrary time in a state in which the recording is continued steadily, after the recording has been started. When the input stream controller 14 detects $GOP_n$ (S101), it transfers $GOP_n$ to the AV stream storage 16 (S102). The input stream controller 14 then informs the recording controller of the fact that the $GOP_n$ has been transferred to the AV stream storage 16, and the address from the head of the GOP, the size, the elapsed time from the start of the recording, the address and the size of the key frame, and the like (S103).

The video recording controller 10 requests the key frame extractor 31 to extract key frame n (S104). The request to extract the key frame n includes information on the address and size of the key frame to be extracted. Based on the information on the key frame, sent from the video recording controller 10, the key frame extractor 31 executes the extraction of the desired key frame n, via the input stream controller 14 (S105). The key frame extractor 31 then writes the extracted key frame n in the key frame temporary storage 33 (S106). Similar operation is thereafter repeated each time the input stream controller 14 detects each GOP, until the recording operation ends (S121 to S146).

Next, metadata generation is described. It is assumed that the present video recording/playback apparatus is of such a specification that metadata is generated every periodic time expiration after the starting of the recording. In such a case, the video recording controller 10 triggers the metadata generation execution based on the temporal periodic timer. The video recording controller 10 issues an instruction to the metadata generator 20 to generate metadata corresponding to the $GOP_n$ (S110). Based on the information of the key frame file table, the metadata generator 20 reads key frame n from the key frame temporary storage 33 (S111).

Based on the key frame thus obtained, the metadata generator 20 generates a thumbnail image, which is a metadata, in the manner shown in FIG. 5, for example. The metadata generation can be executed without regard to the video recording process, and the timing at which metadata generation is started, or the time taken for the metadata, do not affect the video recording operation (which is the primary function of the video audio recording/playback apparatus) or key frame extraction processing. Also, no problem occurs with regard to the operations for processing key frames, as long as the procedure in which the key frame n is read (S111) after key frame n is written (S106) is followed.

As described above, by extracting the key frames by means of the key frame extractor 31, and recording the key frames in the key frame temporary storage 33, the video recording process and the metadata generation process can be performed independently. As a result, even with a CPU or a system configuration which does not have a high process performance, metadata can be generated during video recording operation. Also, the AV stream storage 16 is not accessed for the purpose of metadata generation, so that load on the AV stream storage 16 is not increased, and, accordingly, it is possible to stably execute recording, as well as playback operation which may be carried out simultaneously with the recording.

Figure 13A:
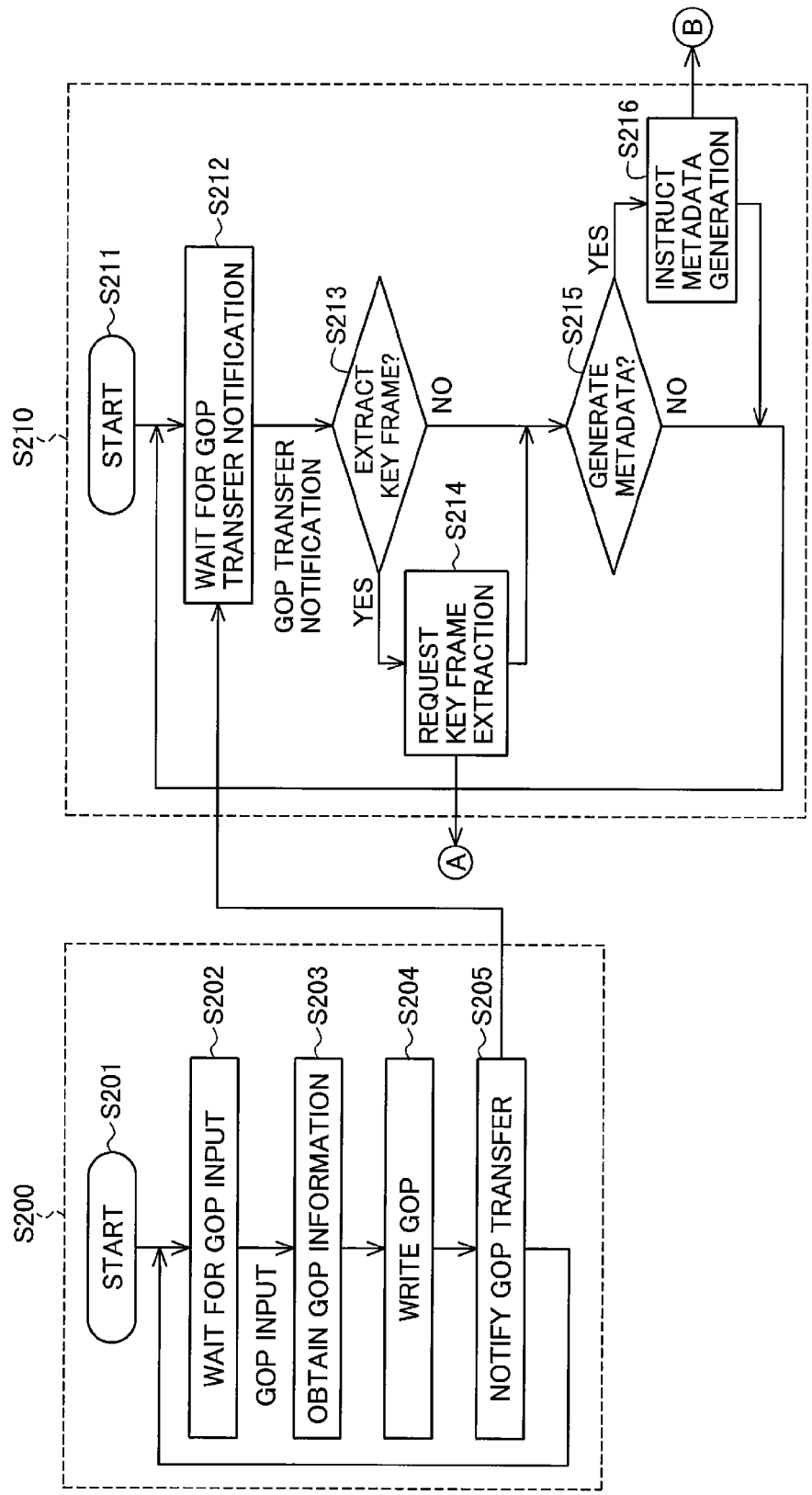
FIGS. 13($a$) and 13($b$) are flowcharts showing the operation flows in the process for metadata generation in Embodiment 1 of the present invention.
Figure 13B:
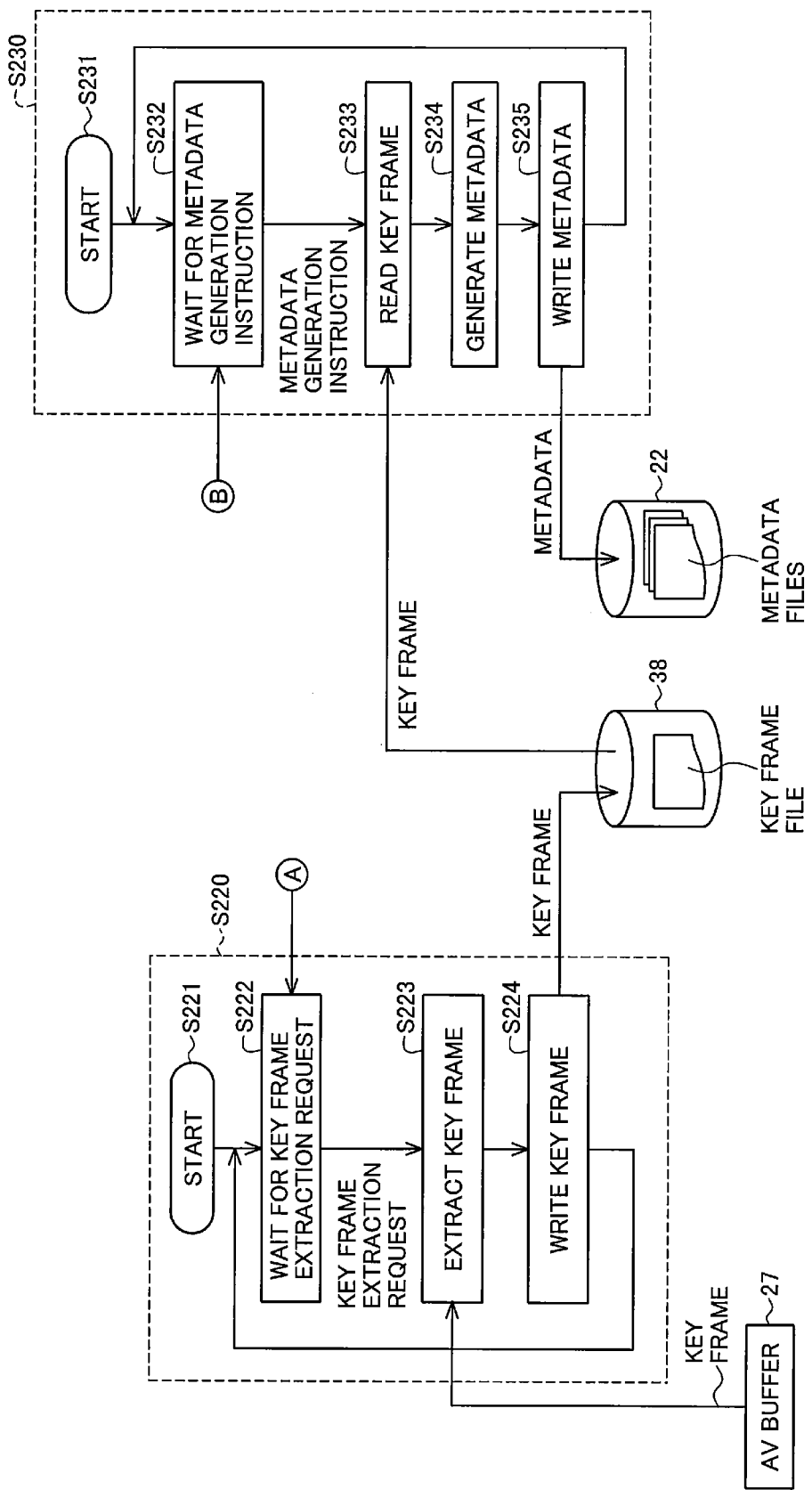

Next, FIGS. 13(a) and 13(b) are used to describe the relationship between the key frame extraction operation and the metadata generation operation. S200 represents the process of the GOP transfer thread operating on the input stream controller 14. When video recording is started (S201), the input stream controller 14 enters into a state in which it waits for the input of a GOP from the digital tuner 3 or the AV encoder (S202). When GOP data is input to the input stream controller 14, information on the GOP, including the data position, the size, the time point information of the GOP, and the size and position of the I pictures within the GOP is obtained (S203). Next, the GOP data is written in the AV stream storage 16 (S204). Next, the fact that the GOP has been transferred to the AV stream storage 16 is notified to the video recording control thread within the video recording controller 10, using asynchronous message communication (S205). After the notification of the GOP transfer completion, the input stream controller 14 again enters into a state in which it waits for the input of a GOP (S202).

Next, the process (S210) of the video recording control thread in the video recording controller 10 is described. When the video recording is started (S211), the video recording control thread enters into a state in which it waits for notification of GOP transfer from the input stream controller 14 (S212). When the GOP transfer notification is received from the input stream controller 14, judgment is made as to whether the key frame is to be extracted from the GOP (S213). If it is judged that the key frame is to be extracted, a key frame extraction request is transmitted to the key frame extraction thread (S220) of the key frame extractor 31, using asynchronous message communication (S214).

When the process for the key frame extraction request is completed, or it is judged that the key frame extraction is not necessary, at the key frame extraction judgment that key frame extraction, then judgment is made as to whether metadata generation is to be performed (S215). If the metadata judgment condition is met, the metadata generation instruction is sent to the metadata generation thread (S230) in the metadata generator 20, using an asynchronous message communication. When the metadata generation instruction to the metadata generation thread is completed, or when the metadata generation judgment finds that the metadata generation is unnecessary, the video recording control thread again enters into a state in which it waits for GOP transfer notification (S212).

Next, the key frame extraction thread (S220) of the key frame extractor 31 is described. When video recording is started (S221), the key frame extraction thread enters into a state in which it waits for key frame extraction request from the process (S210) of the video recording control thread in the video recording controller 10 (S222). Upon reception of the key frame extraction request from the asynchronous message communication mechanism, the key frame extraction thread extracts the key frame from the AV buffer 27 (S223), and writes the extracted key frame at the end of the key frame file in the key frame temporary storage 33 (S224). After that, the key frame extraction thread again enters into a state in which it waits for key frame extraction request from the video recording control thread (S210) in the video recording controller 10.

Next, metadata generation thread (S230) in the metadata generator 20 is described. When the video recording is started (S231), the metadata generation thread waits for the metadata generation instruction from the video recording control thread (S210) in the video recording controller 10 (S232). Upon reception of the metadata generation instruction from the video recording control thread (S210), via the asynchronous message communication mechanism, the metadata generation thread reads data of the key frame from the key frame temporary storage 33 (S233). Next, using the data of the key frame, the metadata generation thread generates metadata (S234), and writes the generated metadata in the metadata storage 22, in the form of a file for each metadata (S235).

The only restriction between the key frame extraction process (S220) in the key frame extractor 31, and metadata generation thread in the metadata generator 20 is that when the metadata generation thread (S230) generates metadata of a key frame, the key frame must be stored in the key frame temporary storage 33, without regard to the which of the processes are conducted first.

Furthermore, the only relation of the metadata generation thread with the GOP transfer thread (S200) in the input stream controller 14, and the video recording control thread (S210) in the video recording controller 10, is asynchronous message communication, and there is no such a problem that the processes of the GOP transfer thread (S200), the video recording control thread (S210), and the key frame extraction thread (S221) are delayed, or made to wait. Depending on the progress of the metadata generation thread (S230). This is because the metadata generation thread does not refer to the AV buffer 27 directly, but by having the key frame data stored in the key frame temporary storage 33, the metadata generation thread can operate independently of the recording stream recording process.

As a result, it is possible to generate metadata in parallel with the video recording operation, without hindering the video recording process (which is the primary process for the video audio recording/playback apparatus) of the video recording/playback apparatus, or even when it is necessary for a CPU of a lower process performance to make software of the present video recording/playback apparatus operate, or the performance (capability) of the entire system is low.

Moreover, because the metadata generation thread (S230) can operate independently of the GOP transfer thread (S200), the video recording control thread (S210), and the key frame extraction thread (S221), even if the metadata generation performs a process of a high processing load, it does not affect the video recording operation, and it is possible for the metadata generation process to involve a time consuming process or a high-load process. It is therefore possible to provide functions of a high-added value as a video recording apparatus.

Figure 14A:
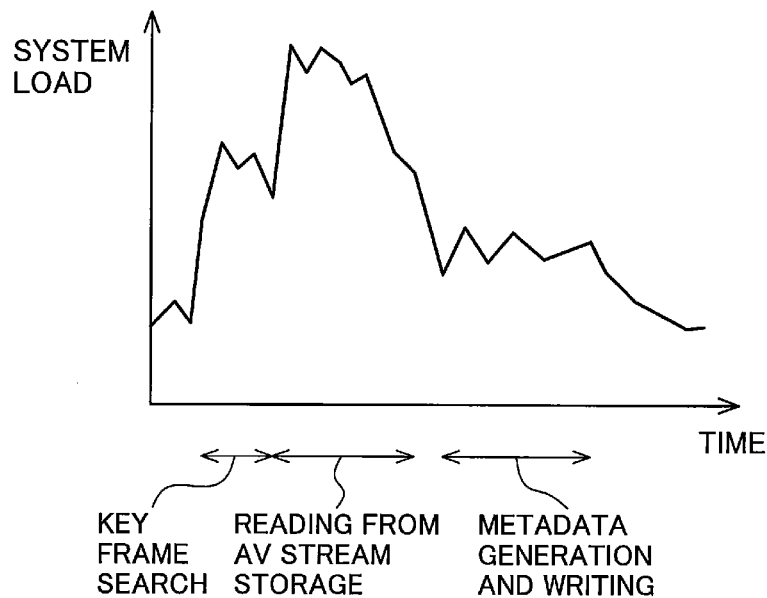
FIG. 14($a$) and ($b$) are diagrams for explaining the system load required for key frame extraction, in Embodiment 1 of the present invention.
Figure 14B:
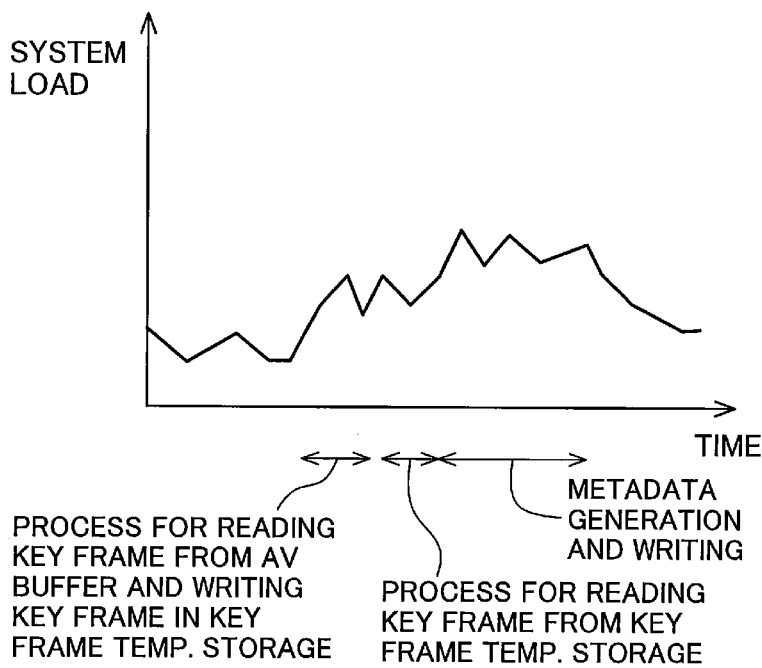

Next, description is made from the viewpoint of load on the CPU, referring to FIGS. 14(*a*) and (*b*). FIG. 14(*a*) shows the case in which key frames used for metadata generation are read from the AV stream storage 16. FIG. 14(*b*) shows the case where the key frames are read from the input stream controller 14 (or the AV buffer 27). As shown in FIG. 14(*a*), when the key frames are read from the AV stream storage 16, the CPU must search for the desired key frame, and, upon finding, reads the bit stream from the AV stream storage 16, and generates the metadata, and writes the generated metadata. In this case, the key frame search and the reading of the key frame from AV stream storage 16 imposes considerable load on the system.

When the key frames are read from the input stream controller as shown in FIG. 14(*b*), the key frames are read from the AV buffer 27, and temporarily stored in the key frame temporary storage 33, and when another event occurs, the key frames are read again from the key frame temporary storage 33, and the metadata is generated and written. In this case, the key frame extraction from the AV buffer 27, and the writing of the key frames in the key frame temporary storage 33 do not impose a heavy load, because what is written is a key frame which is of a small size compared with GOP data, and the memory used for the AV buffer 27 is of a high-speed transfer band. Moreover, reading of the key frame for metadata generation does not cause a large load variation, because the size of the data is small compared with the GOP.

Next, a sequence diagram is used for describing the operation. FIG. 15 shows the sequence for the video recording starting process. When a request for video recording starting is sent from the system controller 2 (S500), the video recording controller 10 requests the key frame extraction controller 30 to perform a key frame extraction initialization process (S501). The key frame extraction controller 30 executes an initialization process (S502) of the key frame extractor 31, and the key frame extractor 31 executes an initialization process (S503) of the key frame record manager 34. In the process of the initialization of the key frame record manager 34, a key frame file is generated, and the file access right is established, and the memory space to treat data as files is secured (so called file open process).

Next, the video recording controller 10 executes the metadata generation initialization process (S504) of the metadata generation controller 18. The metadata generation controller 18 executes the initialization process (S505) of the metadata generator 20, and the metadata generator 20 executes the initialization (S506) of the metadata recorder/reader 21. Next, the video recording controller 10 instructs the AV stream storage 16 to generate an AV stream file, and an address map file (S507) for facilitating the access to the AV stream file. After that, the video recording controller 10 instructs the input stream controller 14 to start the transfer of the bit stream to the AV stream storage 16.

Figure 16:
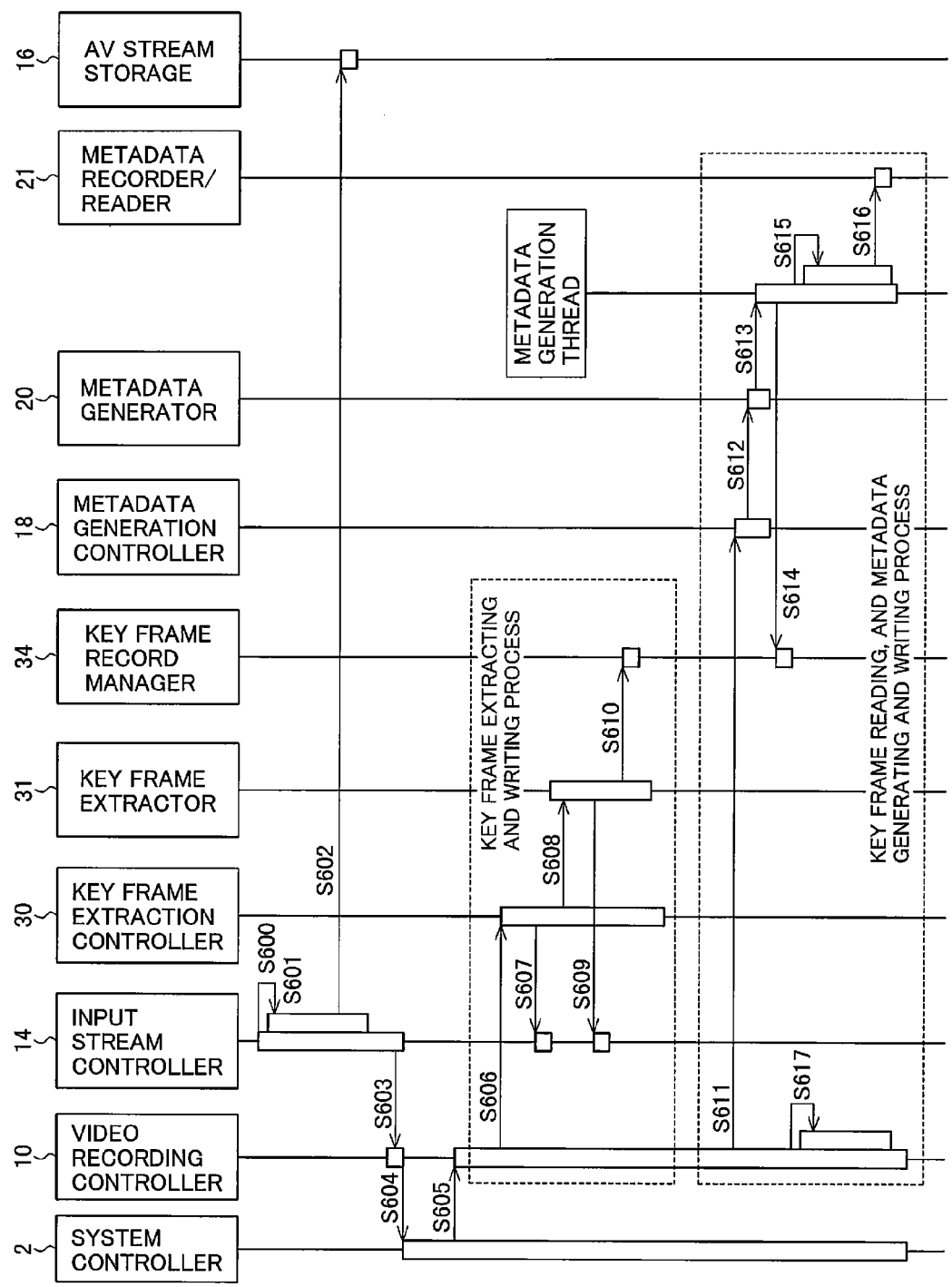
FIG. 16 is a sequence diagram illustrating the process for key frame extraction and metadata generation during video recording, in Embodiment 1 of the present invention.

Next, the operation during video recording is described with reference to FIG. 16. Here, it is assumed that the unit of transfer of the AV stream is a GOP, and access points called entries (so called chapters) are set at certain time points in the recorded video program, and thumbnail images are generated as metadata corresponding to the entries. While the video recording state is continued, and when a new GOP is input to the input stream controller 14, the GOP is detected (S600), and an address map information of the GOP is generated (S601). Next, the detected GOP is recorded in the AV stream storage 16, and an address map corresponding to the GOP is recorded additionally to the already recorded address maps (S602).

The input stream controller 14 notifies the video recording controller 10 of the completion of the recording of the GOP in the AV stream storage 16, and of the information on the recorded GOP (S603). The video recording controller 10 notifies the system controller 2 of the information concerning the video recording at the system, including video recording continuation time (S604). Next, description is made the process followed when the system controller 2 issues an entry generation request (S605) to the video recording controller 10 in a state in which the entry generation condition is satisfied. Upon reception of the entry generation request (S605), the video recording controller 10 requests the key frame extraction controller 30 to extract the key frame which coincides, as to time, with the entry information (S606).

The key frame extraction controller 30 requests the input stream controller 14, which manages data and address on the AV buffer 27 to provide the address information and the size information of the key frame in question (S607). The key frame extraction controller 30 instructs the key frame extractor 31 to obtain the key frame in question (S608).

In doing so, it sends the information concerning the key frame, which it has obtained by the above process, to the key frame extractor 31. Based on the address and size information of the key frame received from the key frame extraction controller 30, the key frame extractor 31 obtains the corresponding key frame from the input stream controller 14 (S609), and records the key frame in the key frame temporary storage 33 (not shown as such), via the key frame record manager 34 (S610).

The video recording controller 10 requests the metadata generation controller 18 to generate metadata (S611). The metadata generation controller 18 confirms that the metadata generation condition is satisfied (e.g., the corresponding key frame is present in the key frame temporary storage 33), and instructs the metadata generator 20 to generate corresponding metadata (S612). To generate a thumbnail which is metadata, MPEG-2 decoding process, and JPEG encoding process are required, and the time taken for the process depends on the screen size, the bit rate, and the CPU process performance, but is usually several seconds or more, so that a dedicated thread is activated.

The metadata generator 20 activates a dedicated thread for generating the thumbnail (S613). The activated metadata generation thread first obtains the corresponding key frame from the key frame temporary storage 33, via the key frame recorder/reader 32 (S614). It then starts the metadata generation process (S615).

Since metadata generation takes several seconds or more, it takes time before the process is completed. But because the present process is an independent operation in the form of metadata generation thread, it does not interfere with the video recording process conducted by the video recording controller 10. When a thumbnail image which is metadata is formed, after several seconds, the thumbnail image which is the metadata is recorded in the metadata storage 22.

When the generation and recording of the metadata is completed (S616), the metadata generation thread may abandon itself, or enter into a sleep state in preparation for the next metadata generation request. On the other hand, the video recording controller 10 generates entry information consisting of the address position information which is an access point, the time information, and the file name of the thumbnail image (S617), and ends the entry generation process.

As has been described, even when the video recording state is continued, the process of recording the GOP data in the bit stream in the AV stream storage 16, and the access to the key frames for metadata generation are independent, and metadata generation from the key frame is also independent, so that metadata can be generated without adversely affecting the video recording process.

The present process is particularly advantageous where the CPU is of a low speed, the system is of a low process performance, load for metadata generation is heavy, or metadata generation requires time in the order of several seconds or more.

Figure 17:
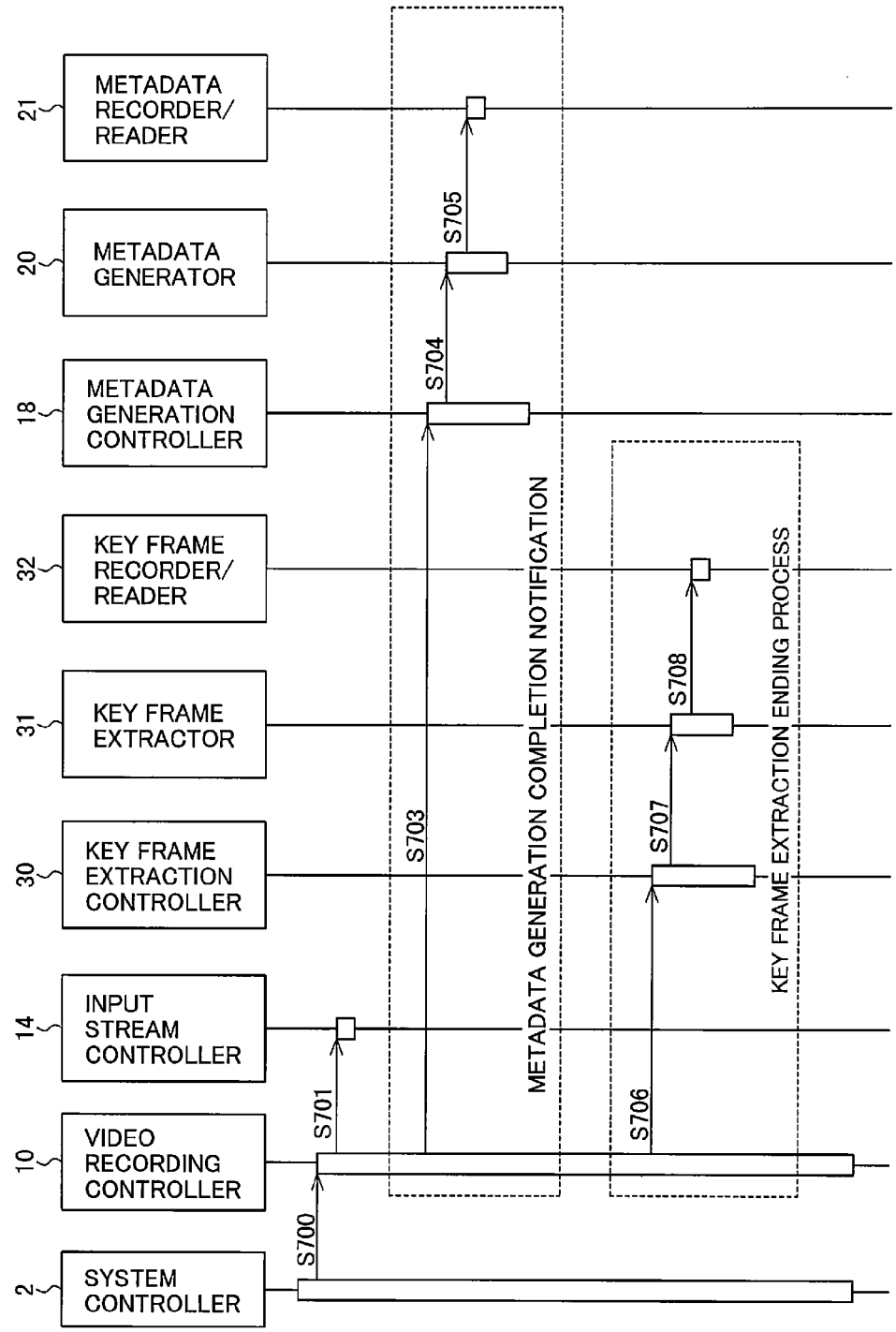
FIG. 17 is a sequence diagram illustrating the video recording ending in Embodiment 1 of the present invention.

Finally, FIG. 17 is used to describe the operation at the time of video recording ending. When the system controller 2 requests the video recording controller to end the video recording (S700), the video recording controller 10 instructs the input stream controller 14 to end the stream transfer process (S701). Thereafter, data transfer to the AV stream storage 16 is no longer carried out. Then, in order to stop the metadata generation process, the video recording controller 10 requests the metadata generation controller 18 to stop the metadata generation (S703). The metadata generation controller 18 requests the metadata generator 20 to stop the process (S704).

The metadata generator 20 causes any operating thread to stop, and causes all the metadata generation processes to stop. The metadata generator 20 also instructs the metadata recorder/reader 21 to complete the writing of any file, if there is any such file being written, and causes completion of the file handling process (S705). Next, the video recording controller 10 instructs the key frame extraction controller 30 to end the key frame extraction process (S706). The key frame extraction controller 30 instructs the key frame extractor 31 to suspend any key frame extraction that is being carried out, and causes all the key frame extraction processes to stop (S707).

The key frame extractor 31 requests the key frame recorder/reader 32 to carry out an ending process (S708), and the key frame recorder/reader 32 which has been requested to carry out the ending process, suspends the key frame writing or reading process, and deletes the key frame file at which all the accesses to the key frame file is stopped. The key frame recorder/reader 32 also deletes the key frame file table for managing the address, size and time information of each key frame in the key frame file. The key frame file and the key frame table are present only while video recording is carried out, and they are deleted when the video recording ends.

In this way, the key frame information can be obtained during video recording, without regard to the substance of the AV stream and the states of the elements such as the input stream controller 14, the AV buffer 27, and the AV stream storage 16, which can access the substance of the AV stream, while the key frame information is deleted when the video recording ends, whereby the deletion contributes to the reduction in the data area in the key frame temporary storage 33. In particular, the configuration is such that only the key frames are stored for the purpose of metadata generation, so that the amount of redundant data is small, and one independent image information can be generated from information of one frame.

The video audio recording/playback apparatus 100 according to the present embodiment which has been described so far, comprises the key frame extractor 31 for extracting key frames from the AV stream to be recorded, the key frame temporary storage 33 for temporarily recording the extracted key frames, the metadata generator 20 for generating metadata, and the metadata storage for storing the generated metadata, and the metadata generator 20 can generate metadata at an arbitrary timing, and it is not necessary to generate metadata at a high speed. Accordingly, even if the CPU or the system is of a relatively low process performance, the metadata can be generated in parallel with the process of video recording of the AV stream.

Moreover the key frame forming part of the AV stream, which is data referred to in metadata generation, is recorded in the key frame temporary storage 33. As a result, even when it is necessary to refer to the data of the AV stream during metadata generation, it is not necessary to access the AV stream storage 16, and it is sufficient to read the data from the key frame temporary storage 33, so that it does not interfere with the operation of recording for the primary purpose in the AV stream storage 16, and the recording of the AV stream which is the primary function of the AV stream storage 16 can be continued normally.

Moreover, it is not necessary for the AV stream storage 16 to read the AV stream for metadata generation, the AV stream storage 16 may be of such a configuration having a low process performance. In practice, the AV stream storage 16 is formed of an HDD or a flash memory, and an HDD or a flash memory having a low transfer band, and of a low price can be used. This is also advantages from the viewpoint of extending the lifetime of the HDD, or reduction of power consumption.

Moreover, because the key frames are extracted from the input stream controller 14, when video recording, or re-recording (e.g., frame rate-converted recording) in the present video audio recording/playback apparatus 100 is performed, the key frame extraction can be carried out in parallel with the video recording operation. This is because, by utilizing the fact that the input stream controller 14 has the functions of transferring data to the AV stream storage 16 and of managing the addresses of the transferred data, connection with the key frame extractor 31 is established, so that extraction of an arbitrary key frame is enabled. Moreover, it is also possible, not only to extract key frames, but also to generate address information (here, key frame file table), after the extraction of the extracted key frame, by the address management function. By the address information, the plurality of key frames can be identified individually.

The key frame temporary storage 33 performs temporary storage, of generating a key frame file at the time of starting the video recording, and additionally recording the key frame as it is detected, in the key frame file, and deleting the key frame file when the video recording is ended. As a result, even if the video recording is performed a plurality of times, the number of key frame files, and the total size do not increase, and it is not necessary to secure a large size for the key frame temporary storage 33, and it is advantageous in terms of cost and file access load.

In the present embodiment, the manner of key frame storage is such that a plurality of key frames are stored in a single file, being joined together. However, each frame may be stored in a separate file. Moreover, a single directory may be generated for each unit of video recording, and each key frame file may be stored in the directory.

When one file is formed for one key frame as described above, the key frame file used for generation of arbitrary metadata may be deleted upon such metadata generation. In this way, the capacity of the metadata temporary storage 33 can be reduced.

Furthermore, the key frame temporary storage 33 may be formed of a volatile medium such as an SDRAM, or a non-volatile medium such as an HDD or a flash memory. Where a volatile medium is used, it is possible to write and read the key frame information at a high speed. Where a non-volatile medium is used, it is advantageous in terms of cost, and when power is shut down, the information retained after the recovery can be used to generate the metadata.

In the present embodiment, the AV stream storage 16 and the key frame temporary storage 33 are separate, so that it is possible to select the optimum recording medium and set the optimum specification for each storage, and it is possible to build a system with a good cost performance.

On the other hand, the AV stream storage 16 and the key frame temporary storage 33 may be formed on a single recording medium, such as a large HDD, then it is possible to reduce cost. In such a case, it is desirable that the area for the AV stream storage 16 and the area for the key frame temporary storage 33 are divided by a partition, or a similar treatment be made. However, the invention is not limited to the details in the implementation, such as the division by a partition.

Even where the AV stream storage 16 and the key frame temporary storage 33 are formed on a large HDD, a DMA function may be allocated to the AV stream storage 16 in which a large-sized data data needs to be written at a high speed, so as to reduce the load on the CPU in transferring the stream, while at the same time the process of writing and reading by means of the CPU may be allocated to the key frame temporary storage 33, which does not require a high speed process.

Moreover, in order to restrain the load on the system, the key frame extraction controller 30 may perform decimation in the key frame extraction. In this way, it is possible to realize the metadata generation taking the system performance (capability) into consideration, enabling stable recording operation and metadata generation operation.

The key frame extraction may be carried out at a predetermined period of time. In this case, the criterion for carrying out the key frame extraction is simple, and it is possible to simplify the implementation, to restrain occurrence of undesired events, and simplify the criterion for implementation, thereby to reduce the load on the system.

It is also possible to carry out the key frame extraction taking the user's key operation as a trigger. This will enable generation of the metadata matching the user's preference, and simplification of the criterion for the key frame extraction and the metadata generation.

By recording the generated metadata together with the title ID or the like for relating with the AV stream recorded in the AV stream storage 16, it is possible to display the metadata when the program having been recorded is played back. Furthermore, it is possible, by having the user use the remote controller to select the metadata displayed on the screen, to start the playback at the position corresponding to the time information of the selected metadata.

The manner of storage in the key frame temporary storage 33 is such that a plurality of key frame data are stored in a single file, so that the data or files do not require individual management (i.e., management of file IDs or file names), and frequent file open/close process need not be carried out, and advantages in regard to the program size, and the process execution speed can be obtained. Even if the present video audio recording/playback apparatus 100 hangs up during video recording operation, and cannot carry out the process of deleting the unnecessary key frame data, which ought to be carried out when the video recording ends, or power supply is turned off, with the result that a key frame data file remains undeleted, the number of the key frame files and the file name are of a constant value, so that it is possible to easily detect and delete the unnecessary key frame data file at the time of re-activation (re-starting).

In the present embodiment, description is made of a case where data extracted from the AV stream are key frames. However, the data extracted from the AV stream and temporarily stored may be other than key frames, but may be any other form of data as long as they can be reproduced and displayed independently, and can be restored if they are compressed, encoded, or encrypted. For instance, if an EPG (Electronic Program Guide) in the AV stream may be temporarily stored and metadata such as characters and figures may generated from the stored data (EPG). By doing so, where the data corresponding to the respective scenes in the broadcast program are embedded, such data can be extracted by the key frame extractor 31 and stored in the key frame temporary storage 33 until the video recording ends, and transformed into metadata by the metadata generator, and stored in the metadata storage 22, so that they can be used to identify each scene during playback.

In the present embodiment, thumbnails are raised as an example of metadata, but the metadata are not limited to thumbnails. For instance, the metadata may be human voices, music, or characteristic sounds obtained from audio information. Also, with regard to video, a picture of a human being extracted from the original video, a partially cut-out image, a combination of plurality of pictures may be extracted from the original AV stream and utilized in one way or another.

In the present embodiment, compressively-encoded video audio data are treated, but data before compression-encoding may be used.

The tuners 3 and 4, the AV encoder 7, the input stream controller 8, and the AV stream recorder 17 involved in the recording in the present invention may be identical to those in the conventional apparatus, so that invention can be implemented by a simple modification from a conventional video audio recording/playback apparatus.

Incidentally, the video audio recording/playback apparatus 100 has a playback function, but the invention is applicable to an apparatus having a recording function only. Such a recording apparatus can be implemented by providing interface functions for outputting the stored AV stream, playback control information, and metadata to the outside. Also, a playback apparatus according to the present embodiment may be configured by using the data, or a medium storing the data output from such interfaces.

Embodiment 2

Figure 18:
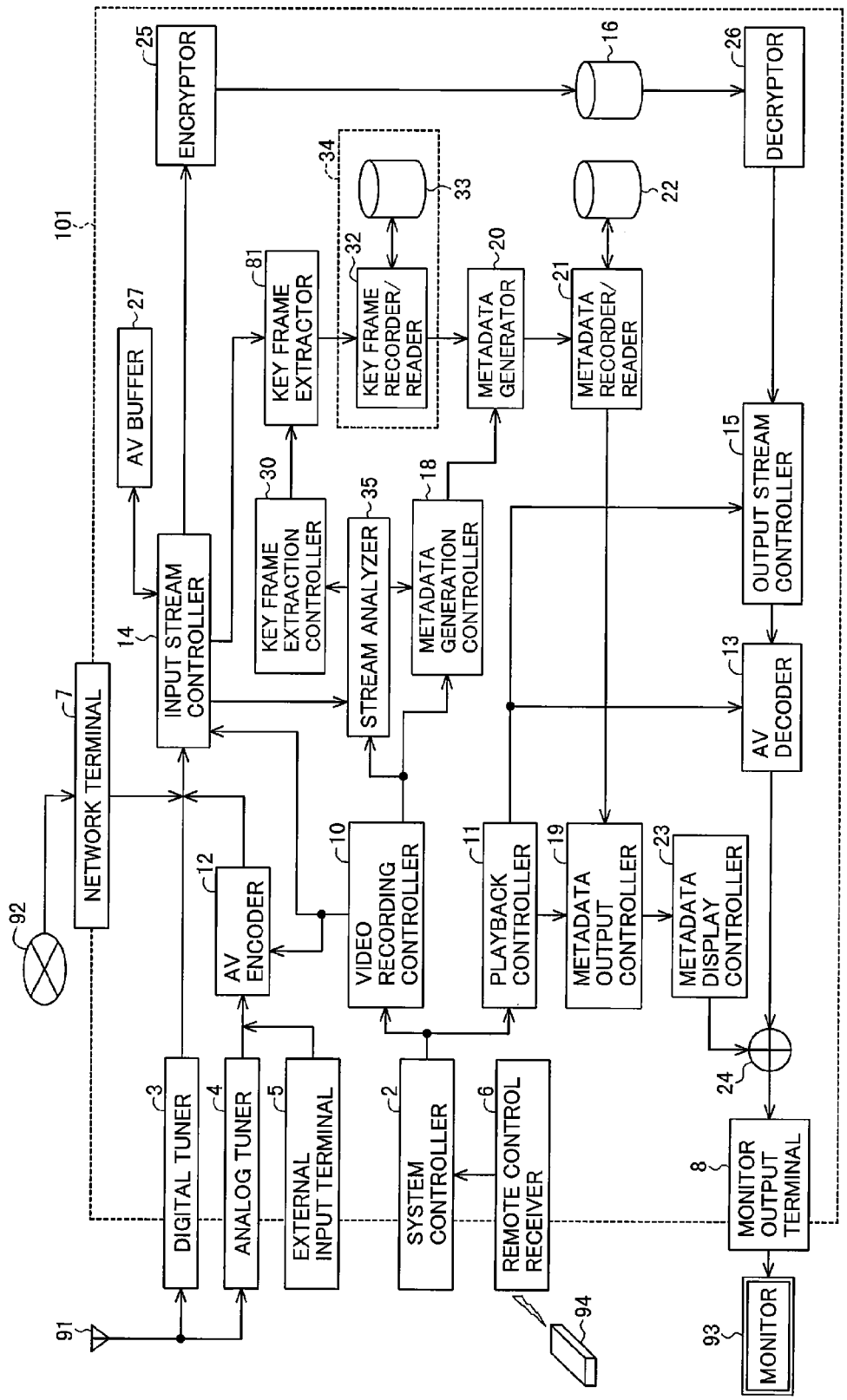
FIG. 18 is a block diagram showing the configuration of a video audio recording/playback apparatus in Embodiment 2 of the present invention.

FIG. 18 is a block diagram showing the configuration of a video audio recording/playback apparatus 101 according to Embodiment 2 of the present invention. The video audio recording/playback apparatus 101 according to the present embodiment is identical to the video audio recording/playback apparatus 100 shown in FIG. 1, except for the addition of a stream analyzer 35.

The present embodiment differs from Embodiment 1, in that the stream analyzer 35 extracts, while the video recording is carried out, the AV stream from the input stream controller 14, and analyzes the video or audio, and transmits the result of the analysis to the key frame extraction controller 30, or the metadata generation controller 18, and the key frame extraction controller 30 or the metadata generation controller 18 generates key frames or metadata, according to their respective criteria.

In the present embodiment, an MPEG-2 transport stream (hereinafter referred to "TS") is received by HTTP protocol from the network, and the received TS is recorded in the AV stream storage 16. It is assumed that a high-definition MPEG-2 video stream and an AAC stream are multiplexed in the TS stream received from the network. The metadata generated is assumed to be thumbnail images in the bit-map format.

The input stream controller 14 temporarily stores the input TS stream in the AV buffer 27, and detects the position and size of each MPEG-2 GOP, and the position and size of each I picture. Moreover, the TS stream is transferred by the DMA mechanism, not shown, built in the input stream controller 14, to the AV stream storage 16 formed of an HDD mechanism. Also, when the detection of the GOPs and the transfer of the GOPs to the AV stream storage 16 are completed, the position and the size of each of the GOPs, the transfer of which has been completed, and the position and size of each of the I pictures are transferred to the video recording controller 10 and the stream analyzer 35.

The stream analyzer 35 having received the notification of transfer of the GOPs, uses the information on the I pictures having been received, to extract the I picture data from the input stream controller 14. The stream analyzer 35 has the function of MPEG-2 decoding, and of analyzing the features of the video, from the decoded video. The stream analyzer 35 decodes the I pictures received from the input stream controller 14, and determines the difference from the image previously decoded, and finds that a scene change has occurred, if the difference is more than a prescribed threshold value. The stream analyzer 35 also has the function of referring to a plurality of image data analyzed previously, and finds that a chapter has occurred when the current image is similar to one or more of the previous images.

When a scene change has occurred, an event indicating the occurrence of the scene change and the difference value representing the degree of the scene change are sent to the key frame extraction controller 30 and the metadata generation controller 18. Based on the scene change occurrence event, and the difference value from the stream analyzer 30, the key frame extraction controller 30 makes a judgment as to whether a key frame extraction process is to be carried out. If a condition for a key frame extraction is met, the key frame extraction controller 30 issues an instruction for key frame extraction to the key frame extractor 31. The key frame extraction process that is carried out responsive to the instruction is identical to that in Embodiment 1.

On the other hand, the metadata generation controller 18 having received the chapter occurrence event, determines whether a key frame corresponding to the designated frame is present in the key frame temporary storage 33, and, if not, whether a key frame is present in the neighboring time of the designated frame. If a corresponding key frame is present, the metadata generation controller 18 sends to the metadata generator 20, a request for metadata generation, and information on the key frame having been found. The metadata generator 20 reads the designated metadata from the key frame temporary storage 33, and performs the MPEG-2 decoding process, and outputs the decoded image in the bit map format. The metadata recorder/reader 21 stores bit map data generated by the metadata generator 20, in the metadata storage 22.

As has been described, the AV stream is analyzed by the stream analyzer 35, and extraction of the key frame and generation of metadata are controlled according to the result of the analysis, so that the key frame extraction and metadata generation can be carried out according to the state of the video of the AV stream. As a result, it is possible to generate metadata according to the features of the recorded video and audio. Moreover, it is possible to extract the key frames only when a scene change occurs in the actual video, so that it is possible to avoid extraction of unnecessary key frames, and it is possible to reduce the load on the system, and reduce the capacity of the key frame temporary storage 33.

Now, description is made of the data size in the key frame temporary storage 33. When BS (broadcast satellite) digital broadcasting is recorded, the AV stream is recorded at a transfer rate of 24 Mbps in the AV stream storage 16. During such data transfer, the input stream controller 14 extracts the I pictures which are key frames, from the AV buffer 27. As a result, the size of the key frame file in the key frame temporary storage 33 is increased at a rate of about 1 Mbytes/sec. This means the required size of the key frame file is 7.2 Gbytes if the recorded video program has a length of two hours; it is 28.8 Gbytes for a program of 8 hours, which is a maximum video recording time for an ordinary consumer recorder. If key frames are stored only upon occurrence of a scene change, as in the present embodiment, and if an average length of each scene is five seconds, so that one I picture is recorded every five seconds, the required size is reduced to 0.72 Gbytes for a program of two hours, and it is reduced to 2.88 Gbytes for eight hours.

Figure 19:
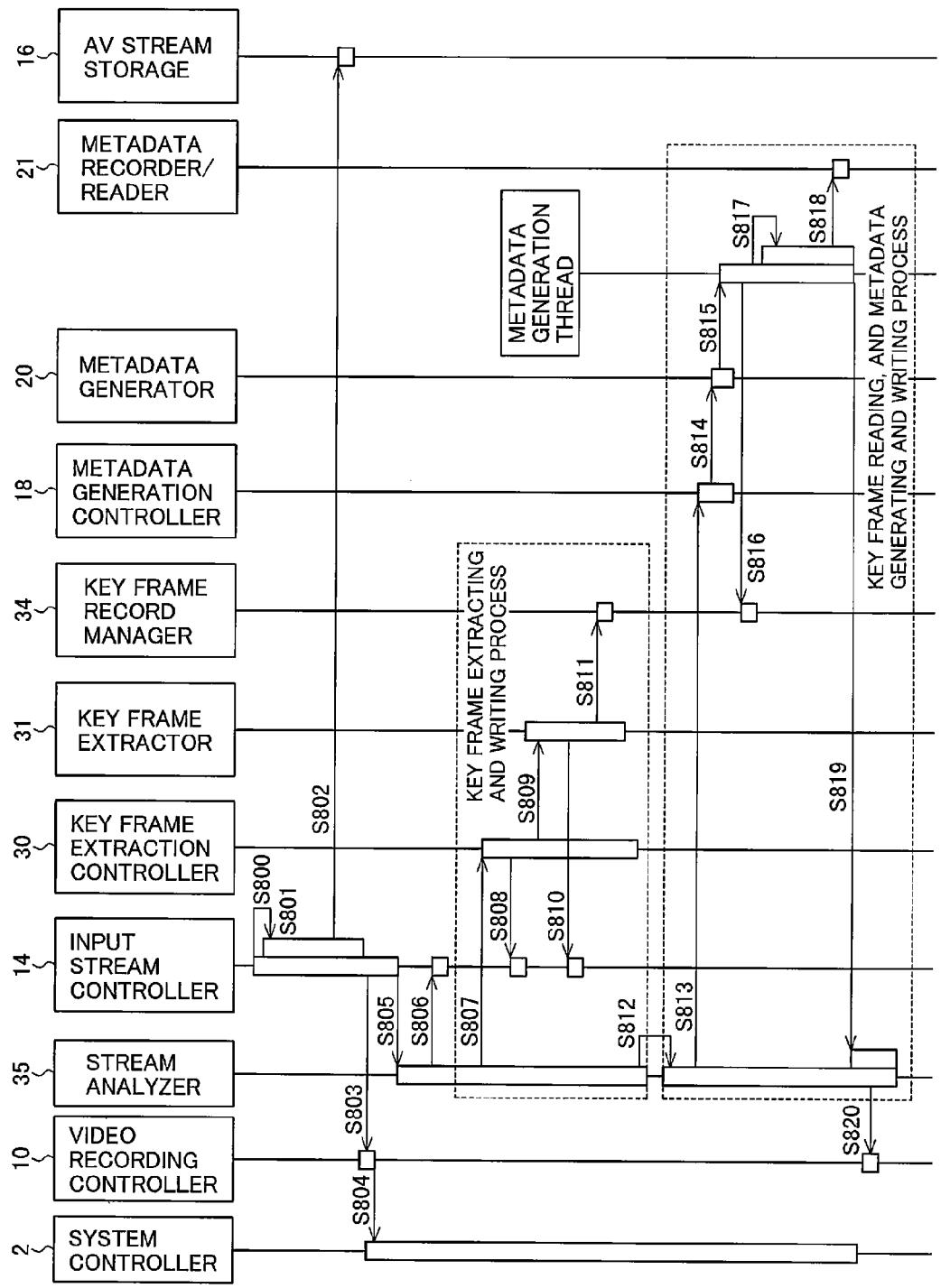
FIG. 19 is a sequence diagram illustrating the process for key frame extraction and metadata generation during video recording, in Embodiment 2 of the present invention.

Next, FIG. 19 is used to describe video recording by means of the video recording/playback apparatus having the stream analyzer 35. While, in the video recording/playback apparatus 101, the video recording state is continued, the input stream controller 14 performs GOP detection process. When $GOP_n$ is detected (S800), an address map of $GOP_n$ is generated (S801). Next, a DMA mechanism not shown is used to transfer $GOP_n$ to the AV stream storage 16 (S802). At the same time, the address map of the $GOP_n$ is stored, being added to the address maps of the GOPs preceding $GOP_n$ and already present in the AV stream storage 16. When the transfer of $GOP_n$ is completed, the video recording controller 10 is notified of the completion of the writing of $GOP_n$ (S803). Furthermore, the system controller 2 is notified of the video recording information, such as the current video recording elapsed time point (S804). The notification of the transfer of $GOP_n$ is also sent to the stream analyzer 35 (S805).

Upon reception of the notification of the transfer of $GOP_n$, the stream analyzer 35 receives the key frame of $GOP_n$ from the input stream controller 14 (S806). The stream analyzer 35 performs decoding process on the I picture which is a key frame, and determines the difference from the previous frame, and finds occurrence of a scene change if the difference exceeds a threshold value. The stream analyzer 35 stores at least two image data preceding $GOP_n$ or characteristic data of at least two images, preceding $GOP_n$, and has the function of determining correlation between the stored images, and finding the interval between two images having an extremely low correlation. If for instance, the correlation is extremely low between $GOP_{m-1}$ and $GOP_m$, a chapter is found to be present at the position of $GOP_m$.

If a scene change occurs at $GOP_n$, an event indicating the occurrence of the scene change and the difference value indicating the degree of the scene change are sent to the key frame extraction controller 30 (S807). The key frame extraction controller 30 verifies whether the difference value is proper, and whether the time point information of $GOP_n$ is correct (S808), and if it finds that it is possible to obtain the key frame, it instructs the key frame extractor 31 to obtain the key frame at the designated time point (S809). The key frame extractor 31 obtains the corresponding key frame from the input stream controller 14 (S810), and asks the key frame recorder/reader 32 to write the obtained key frame. The key frame recorder/reader 32 writes $GOP_n$ in the key frame temporary storage 33 (S811).

If, simultaneously with the detection of the scene change, the stream analyzer 35 finds that the correlation between image has become extremely low at $GOP_m$, which precedes $GOP_n$, the stream analyzer 35 notifies another thread within itself, that a chapter has been detected at $GOP_m$ (S812). The above-mentioned another thread within the stream analyzer 35 receives an event indicating the detection of a chapter at $GOP_m$, and transmits the event indicating the occurrence of the chapter to the metadata generation controller 18 (S813). The metadata generation controller 18 judges whether the key frame corresponding to $GOP_m$ is stored in the key frame temporary storage 33 in the key frame record manager 34, and, if the key frame is found to be stored, it instructs the metadata generator 20 to generate the metadata (S814).

The metadata generator 20 activates the metadata generation thread (S815), causing extraction of the key frame of $GOP_m$ (S816), and generates a thumbnail image in the bit map format, constituting the metadata, from the extracted key frame (S817). When the generation of the thumbnail image is completed, the metadata generation thread asks the metadata recorder/reader 21 to write the metadata in the metadata storage 22 (S818). When the writing of the metadata is completed, the metadata generation thread transmits a notification of metadata generation completion to the stream analyzer 35 (S819). Upon reception of the notification of the metadata generation completion, the stream analyzer 35 asks the video recording controller 10 to generate entry information to facilitate access, e.g., by a skip button, to the chapter point, in the playback of the program (S820). In response, the video recording controller 10 generates the entry information.

$GOP_m$ which is at the chapter position detected by the stream analyzer 35, and the data of $GOP_m$ are those in the past, and are no longer in the AV buffer 27 connected to the input stream controller 14, so that they cannot be read from the AV buffer 27. However, because the key frames are stored in the key frame temporary storage 33, it is possible to extract the key frame at the time point in the past.

Moreover, the AV stream storage 16 stores the AV stream to be recorded, and the process load on it may be very heavy. Also, as was explained in connection with Embodiment 1, data is recorded in the HDD forming the AV stream storage 16 after being encrypted, and decryption needs to be carried out when reading. But because of the possibility of the program playback, it cannot be used. However, as in the present embodiment, the key frames are stored in the key frame temporary storage 33, in a state in which they are not encrypted, during video recording, there is no increase in the process load due to access to the AV stream storage 16, and there is no need of additional implementation of the decryption function.

In the present embodiment, a key frame is stored when a scene change, which is a difference between two images, has occurred, and when there is a substantial transition in the scene (a greater change in the scene) between groups of images, a chapter is found to have occurred, and a thumbnail which is metadata is generated.

Figure 20:
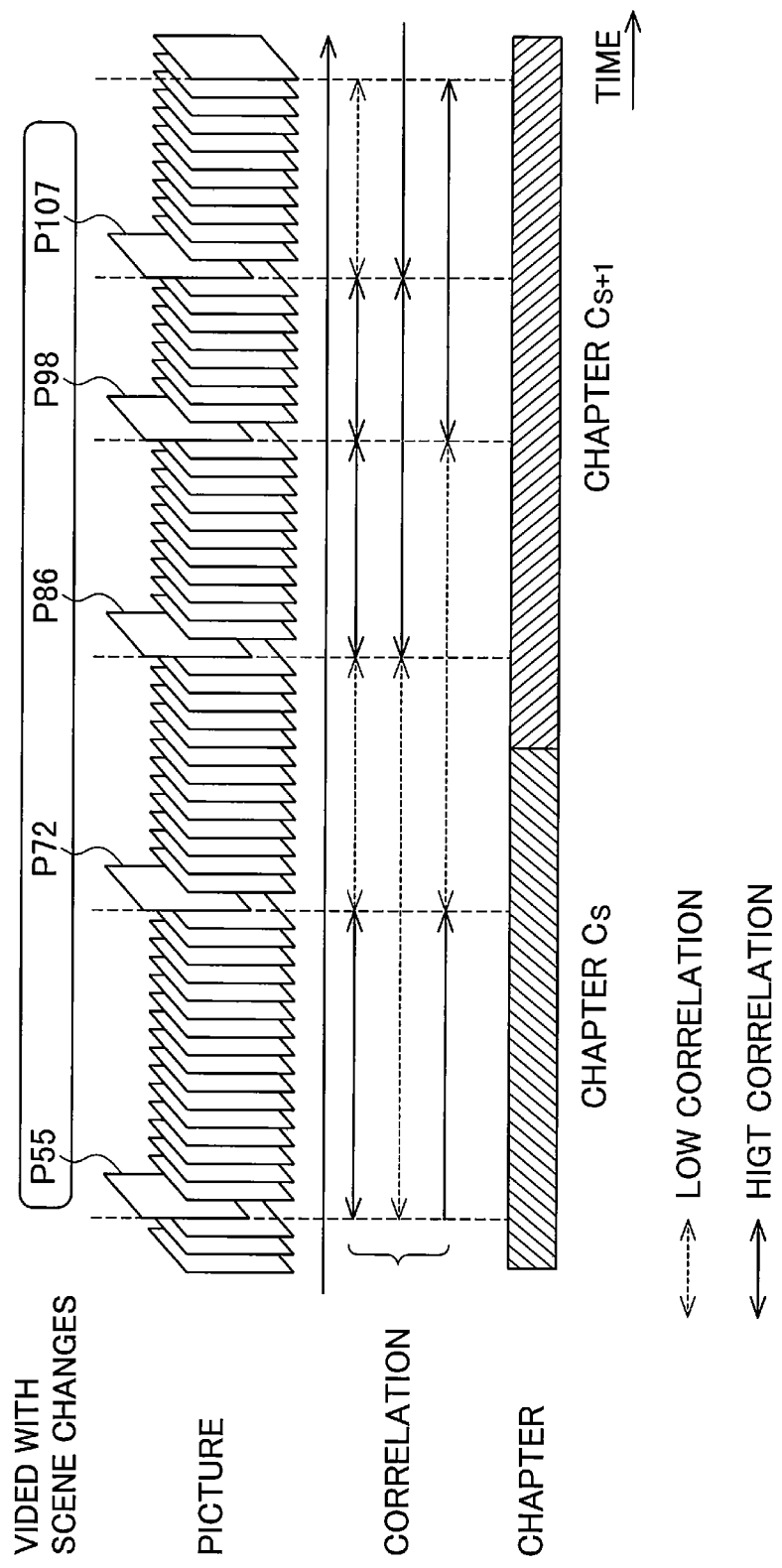
FIG. 20 is a diagram showing the relationship between scene changes and chapters in Embodiment 2 of the present invention.

Here, description is made of the difference between a scene change and a chapter, referring to FIG. 20. In the figure, I pictures which are all key frames are shown to be arranged in the time direction. If the image difference between an arbitrary picture and an immediately preceding picture exceeds a predetermined threshold value, a scene change is found to have occurred at the picture. The illustrated example shows a scene change at P55, P72, P86, P98, and P107. Next, the difference value between the images at which the scene change has found to have occurred, e.g., two pictures adjacent to each other, is determined.

If the difference value exceeds a threshold value for the chapter detection, which is larger than the threshold value for the scene change detection, the interval between the pair of pictures is found to be a chapter boundary. A larger difference corresponds to smaller correlation. In FIG. 20, "correlation" rather than "difference" between pair of pictures are shown to be determined, and it is shown that whether the "correlation" between an I picture at a scene change point, and another I picture at another scene change point is smaller than a threshold for chapter detection is determined. In the illustrated example, the interval between P72 and P86 satisfies the condition, and found to be a chapter boundary. Accordingly, a thumbnail image which is metadata is generated. For determining the difference between groups of images, or between images which are apart in time, and generating a thumbnail image for a time point considerably a long time ago (or, which is farther away from the time point of which the image data) is required for scene change detection based on images adjacent to each other, it was necessary to obtain the image data from the AV stream storage 16, according to the conventional apparatus, because such image data is no longer present in the AV buffer 27.

However, as was explained above, the AV stream storage 16 is generally formed of an HDD, and encryption is made, so that it is difficult to use a decryption block for the purpose of metadata generation, because of the restriction on the number of resources for encryption and decryption blocks. According to the present embodiment, only the key frames are extracted by the key frame extractor 31, and stored in the key frame temporary storage 33, until the video recording is completed, so that it is possible to generate metadata of the image in the past.

The video audio recording/playback apparatus 101 according to the present embodiment having been described, comprises the key frame extractor 31 for extracting the key frames from the AV stream which is to be recorded, the key frame temporary storage 33 for temporarily storing the extracted key frames, the metadata generator 20 for generating metadata, the metadata storage 22 for storing the metadata, and the stream analyzer 35 for analyzing the AV stream to be recorded, so that it is possible to generate metadata in parallel with the execution of the video recording process, even if a CPU or the system configuration is of a relatively low process performance.

According to the present embodiment, the AV stream to be recorded is analyzed, and the key frame extraction is carried out based on the characteristic of the AV stream, so that, in addition to the effects of Embodiment 1, the following effects are obtained.

According to the present embodiment, the AV stream to be recorded is analyzed, and the key frame extraction is carried out based on the characteristic of the AV stream, so that it is possible to avoid storing the images which is very similar to another, as a key frame, with the result that the capacity of the key frame temporary storage 33 can be reduced.

Moreover, the number of key frame extractions, and the frequency at which the key frame is written in the key frame temporary storage 33 are reduced, so that the load on the system as a whole can be reduced.

Moreover, the number of key frames which are temporarily stored, can be reduced, so that it is possible to reduce the size of the key frame file table for storing the attribute of each key frame, including the size, time point in the original AV stream, the location where the key frame is stored, and to reduce the capacity of the recording medium.

Moreover, the number of key frames which are temporarily stored is reduced, so that the time required for searching for the corresponding key frame at the time of metadata generation can be shortened.

Moreover, the condition for generating metadata includes the condition for generating a key frame, so that it is possible to avoid a situation where the corresponding key frame is not present at the time of metadata generation.

If it is desired to use a characteristic video and audio signal as metadata, the stream analyzer 35, which analyzes the characteristic of the AV stream, can also be used to make judgment as to whether the condition for metadata generation is met.

Embodiment 3

Figure 21:
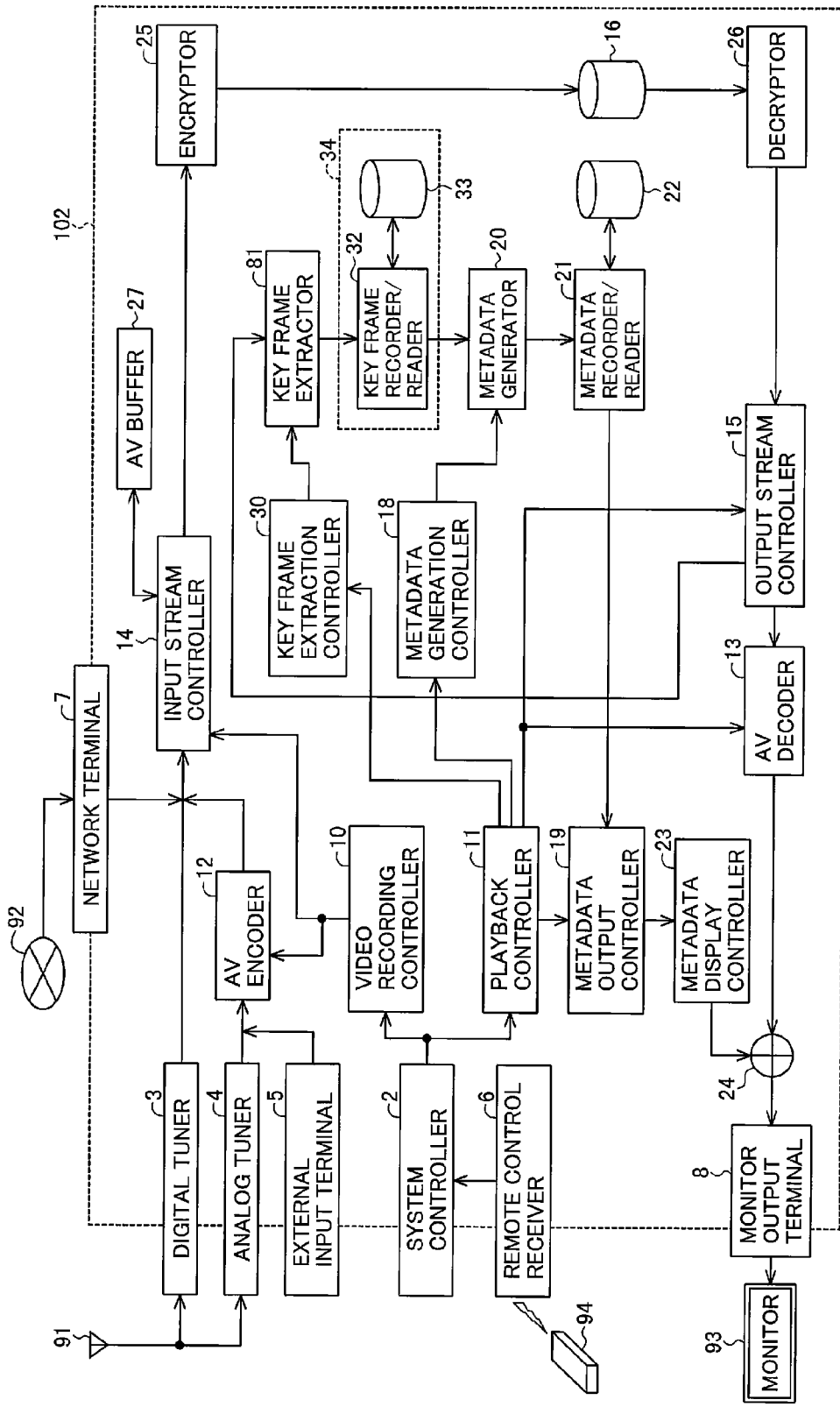
FIG. 21 is a block diagram showing the configuration of a video audio recording/playback apparatus in Embodiment 3 of the present invention.

FIG. 21 is a block diagram showing the configuration a video audio recording/playback apparatus 102 according to Embodiment 3 of the present invention. The video audio recording/playback apparatus 102 according to the present invention is featured by the fact that the AV stream stored in the AV stream storage 16 is read, and the key frames are extracted from the output stream controller 15, and the key frame extractor 31 obtains the key frames from the output stream controller 15. Accordingly, the key frame extraction controller 30 and the metadata generation controller 18 are controlled by the playback controller 11. In other respects, the video audio recording/playback apparatus 102 according to Embodiment 3 is similar to the video audio recording/playback apparatus 100 shown in FIG. 1. The AV stream is also assumed to identical to that in Embodiment.

In the present embodiment, the metadata generation is carried out during playback. When the user presses a button relating to playback on the remote controller 94, or the like, an infrared signal for the playback is transmitted to the control receiver 6, and a corresponding signal is transmitted to the system controller 2. The system controller 2 sends an instruction to the playback controller 11 to play back the program having been designated. The playback controller 11 sends an instruction to the output stream controller 15 to read the corresponding AV stream from the AV stream storage 16, and transfer the AV stream to the AV decoder 13. The AV stream output from the output stream controller 15 is decoded at the AV decoder 13 to the original display image, and supplied via the monitor output 8 to the monitor 93 for display. While the playback is continued, the output stream controller 15 detects the position and size of each GOP, and the position and size of each I picture in the AV stream.

When the output stream controller 15 detects a GOP, a notification indicating the detection of the GOP is sent to the playback controller 11, and then to the key frame extraction controller 30. The key frame extraction controller 30 issues an instruction to the key frame extractor 31 to extract I pictures in the GOP in question. The subsequent process for the key frame extraction is identical to that in Embodiment 1.

The playback controller 11 having received the notification indicating the detection of a GOP instructs the metadata generation controller 18 to generate metadata. The metadata generation usually requires time, so that the frequency of the metadata generation instruction should be lower than the key frame extraction instruction to the key frame extraction controller 30. Upon reception of the metadata generation instruction, the metadata generation controller 18 generates the metadata using the key frame data stored in the key frame temporary storage 33, in the same manner as in Embodiment 1, and stores the generated metadata in the metadata storage 22.

By continuing the playback in this way, the metadata for the recorded program can be generated.

When the playback ends, the required metadata is stored in the metadata storage 22. Accordingly, the key frames in the key frame temporary storage 33 are no longer required, and they are therefore deleted. In this way, it is possible to generate the metadata of the recorded program, and the key frames are present only temporarily, and the capacity of the key frame storage 33 does not become unnecessarily large.

If the generated metadata are thumbnails, the metadata which the metadata output controller 19 requires are read from the metadata storage 22 via the metadata recorder/reader 21, and are transformed into an image at the metadata display controller 23, and synthesized at the graphics superimposing section 24, so that the thumbnail images are superimposed with the playback video or only the thumbnail images are displayed (see FIG. 2).

It is important to supply the AV stream steadily to the decoder during playback. If the present configuration were not employed, and attempt were made to extract the key frames directly from the AV stream during playback, it might not be possible to secure the transfer rate of the AV stream required for the display, and the images might not be displayed smoothly, and may stop instantly, or at the worst case, a system hang-up may occur. According to the present embodiment, the key frames are obtained at the output stream controller, so that the key frame extraction can be achieved without increasing the load on the AV stream storage 16.

Moreover, the extracted key frames are temporarily stored in the key frame temporary storage 33, and can be read when necessary. As a result, the restriction on the timing of metadata generation, and the time length taken by the metadata generation can be alleviated.

As has been described, according to the video audio recording/playback apparatus 102 of the present embodiment, the key frame extractor 31 obtains the key frames from the output stream controller 15, and the obtained key frames are temporarily stored in the key frame temporary storage 33, and sent to the metadata generator, so that metadata generation is possible during playback. This is achieved by utilizing the fact that the output stream controller 15 reads the AV stream from the AV stream storage 16 during playback, and no separate means or process for reading the AV stream is required, but it is sufficient to extract the key frames from the AV stream temporarily present in the output stream controller 15, and to generate the metadata. As a result, even if the CPU or the system configuration of a relatively low process performance is used, it is possible to generate the metadata in parallel with the process of playback of the AV stream.

Although not illustrated, the video output from the output stream controller 15, and decoded by the AV decoder 13 may be input to the AV encoder 12 and recorded again by the input stream controller 14 into the AV stream recorder, so that video recording with re-encoding can be achieved in the present video audio recording/playback apparatus. Also, in such a case, the key frame extractor 31 may extract the key frames from the input stream controller 14 as shown in Embodiment 1, or the output stream controller 15, as shown in Embodiment 3, and the extracted key frames may be stored in the key frame temporary storage 33, and the metadata generator 20 may generate the metadata at a desired timing.

What is claimed is:

1. An audio-video (AV) recording/playback apparatus comprising:
    an AV storage that records AV data in such manner as to require decoding for playback;
    an input stream controller that, in accordance with a first thread, temporarily stores the AV data, and transfers the AV data to the AV storage for recording therein;
    a key frame extractor that extracts key frames from the input stream controller, each of the extracted key frames being an I picture extracted by the key frame extractor upon occurrence of a scene change;
    a key frame temporary storage that stores the key frames extracted by the key frame extractor in parallel with the recording of the AV data in the AV storage;
    and a metadata generator that, in accordance with a second thread, obtains the key frames stored in the key frame temporary storage, and generates metadata including thumbnail images from the obtained key frames,
    wherein the second thread operates independent of and in parallel with the first thread,
    wherein the metadata generator operates independent of and in parallel with said recording of said AV data in said AV storage,
    wherein the key frames are stored in the key frame temporary storage in such manner that the metadata generator does not need to perform the decoding to process the key frames, and
    wherein the metadata generator generates the thumbnail images, independent of and in parallel with recording of said AV data in said AV storage, by converting the obtained key frames into an image file format with the information of address, size, and time stamp of each key frame.

2. The AV recording/playback apparatus of claim 1, further comprising:
    a metadata recorder/reader that performs recording and reading of the metadata generated by the metadata generator.

3. The AV recording/playback apparatus of claim 1, wherein the key frame temporary storage is formed of a non-volatile medium.

4. The AV recording/playback apparatus of claim 1, wherein the key frames stored in the key frame temporary storage are deleted when the video recording ends.

5. The AV recording/playback apparatus of claim 1, wherein the key frame temporary storage is formed of the same medium as the AV storage.

6. The AV recording/playback apparatus of claim 1, further comprising a key frame extraction controller that controls the number of key frame extractions or the timing of key frame extraction by the key frame extractor.

7. The AV recording/playback apparatus of claim 6, further comprising:
an AV analyzer that analyzes the characteristic values of the AV data;
wherein the timing of the key frame extraction by the key frame extractor is determined based on the result of the analysis by the AV analyzer.

8. The AV recording/playback apparatus of claim 1, further comprising:
a metadata generation controller that controls the timing of the metadata generation and the number of metadata generations.

9. The AV recording/playback apparatus of claim 8, wherein
the metadata generation controller determines the timing of the metadata generation based on the characteristic values of the AV data.

10. The AV recording/playback apparatus of claim 9, wherein
the key frame temporary storage has a single key frame data for each AV data.

11. An audio-video (AV) recording/playback apparatus comprising:
an AV storage that records AV data in such manner as to require decoding for playback;
a decoding processor that, according to a playback operation, decodes the AV data and transfers the decoded AV data to an output device which plays back the decoded AV data;
an output stream controller that, according to the playback operation, reads the AV data from the AV storage and transfers the AV data to the decoding processor;
a key frame extractor that extracts key frames from the AV data read by the output stream controller in parallel with the transfer of the AV data read by the output stream controller to the decoding processor and the transfer of the decoded AV data to the output device according to the playback operation, each of the extracted key frames being an I picture extracted by the key frame extractor upon occurrence of a scene change;
a key frame temporary storage that stores the key frames extracted by the key frame extractor in parallel with the transfer of the AV data read by the output stream controller to the decoding processor and the transfer of the decoded AV data from the decoding processor to the output device according to the playback operation;
and a metadata generator that, according to a metadata generating process, obtains the key frames stored in the key frame temporary storage, and generates metadata including thumbnail images from the key frames,
wherein the metadata generating process operates independent of and in parallel with the playback operation,
wherein the key frames are stored in the key frame temporary storage in such manner that the metadata generator does not need to perform the decoding to process the key frames, and
wherein the metadata generator generates the thumbnail images, independent of and in parallel with the playback operation, by converting the obtained key frames into an image file format with the information of address, size, and time stamp of each key frame.

12. An audio-video (AV) recording/playback method comprising the steps of:
recording AV data in an AV storage in such manner as to require decoding for playback;
temporarily storing the AV data in an input stream controller in accordance with a first thread, and transferring the AV data to the AV storage for recording therein;
extracting key frames from the input stream controller;
storing the extracted key frames in a key frame temporary storage in parallel with the recording of the AV data in the AV storage;
and in accordance with a second thread, obtaining the key frames stored in the key frame temporary storage, and generating metadata including thumbnail images from the obtained key frames,
wherein the second thread operates independent of and in parallel with the first thread,
wherein the thumbnail images are generated independent of and in parallel with said recording of said AV data in said AV storage, by converting the obtained key frames into an image file format with the information of address, size, and time stamp of each key frame,
wherein the key frames are stored in the key frame temporary storage in such manner that the metadata generator does not need to perform the decoding to process the key frames, and
wherein each of the extracted key frames is an I picture extracted upon occurrence of a scene change by the extracting step.

13. The AV recording/playback method of claim 12, further comprising the step of:
performing recording and reading of the generated metadata generated by the metadata generator.

14. The AV recording/playback method of claim 12, wherein the key frame temporary storage is formed of a non-volatile medium.

15. The AV recording/playback method of claim 12, further comprising the step of deleting the key frames stored in the key frame temporary storage when the video recording ends.

16. The AV recording/playback method of claim 12, further comprising the step of:
controlling the number of key frame extractions or the timing of key frame extraction by the key frame extracting step.

17. The AV recording/playback method of claim 16, further comprising the step of analyzing the characteristic values of the AV data;
wherein the timing of the key frame extraction by the key frame extracting step is determined based on the result of the analysis by the AV analyzing step.

18. The AV recording/playback method of claim 12, further comprising step of controlling the timing of the metadata generation and the number of metadata generations.

19. The AV recording/playback method of claim 18, further comprising the step of determining the timing of the metadata generation based on the characteristic values of the AV data.

20. The AV recording/playback method of claim 19, wherein
said key frame temporarily recording step processes a single key frame data for each AV data.

21. The AV recording/playback apparatus of claim 1, wherein
the key frame extractor generates a key frame file joining together the extracted key frames as they are stored in the key frame temporary storage, and the key frame extractor further generates a key frame file table including information on each key frame's size and position in the key frame file, and
the metadata generator utilizes the key frame file table to access the key frames from the key frame file table, and generates the metadata from the accessed key frames.

22. The AV recording/playback method of claim 12, wherein
- the extracting key frames step includes generating a key frame file joining together the extracted key frames as they are stored in the key frame temporary storage, and
- the extracting key frames step further includes generating a key frame file table including position information and size information of the key frames, and
- the metadata is generated from the key frames based on the key frame file table.

* * * * *